(12) United States Patent
Ishihara et al.

(10) Patent No.: US 6,254,282 B1
(45) Date of Patent: Jul. 3, 2001

(54) OPTICAL TRANSMIT-RECEIVE MODULE, OPTICAL TRANSMIT-RECEIVE COUPLER AND OPTICAL TRANSMIT-RECEIVE SYSTEM USING SAME

(75) Inventors: Takehisa Ishihara; Hideki Miyuki, both of Yamatokooriyama; Kazuhito Nagura, Kashihara; Kentaro Terashima, Kitakatsuragi-gun, all of (JP)

(73) Assignee: Sharp Kabushiki Kaishi, Osaka (JP)

( * ) Notice: Subject to any disclaimer, the term of this patent is extended or adjusted under 35 U.S.C. 154(b) by 0 days.

(21) Appl. No.: 09/292,520

(22) Filed: Apr. 15, 1999

(30) Foreign Application Priority Data

May 27, 1998 (JP) .................................................. 10-145492
Oct. 16, 1998 (JP) .................................................. 10-294323

(51) Int. Cl.[7] ...................................................... G02B 6/38
(52) U.S. Cl. ........................................... 385/73; 385/39
(58) Field of Search ................................. 385/73, 39

(56) References Cited

U.S. PATENT DOCUMENTS

| 3,910,678 | * | 10/1975 | McCartney et al. | 385/58 |
| 3,914,015 | * | 10/1975 | McCartney | 385/54 |
| 3,963,323 | * | 6/1976 | Arnold | 385/62 |
| 4,512,630 | * | 4/1985 | Runge | 385/73 |
| 4,662,713 | * | 5/1987 | Davies et al. | 385/71 |
| 4,718,746 | * | 1/1988 | Chrepta | 385/74 |
| 4,900,125 | * | 2/1990 | Iyer | 385/70 |
| 5,062,254 | * | 11/1991 | Tomita et al. | 53/467 |
| 5,363,461 | * | 11/1994 | Bergmann | 385/78 |
| 5,452,386 | * | 9/1995 | Van Woesik | 385/72 |
| 5,960,139 | * | 9/1999 | Henning | 385/73 |
| 6,139,194 | * | 10/2000 | Bella et al. | 385/73 |

FOREIGN PATENT DOCUMENTS

| 59-156214 | 10/1984 | (JP) . |
| 2-13205 | 1/1990 | (JP) . |
| 3-175406 | 7/1991 | (JP) . |
| 5-333237 | 12/1993 | (JP) . |
| 6-140106 | 5/1994 | (JP) . |
| 8-130507 | 5/1996 | (JP) . |
| 8-136764 | 5/1996 | (JP) . |
| 2-530002 | 12/1996 | (JP) . |
| 2-676705 | 7/1997 | (JP) . |

* cited by examiner

*Primary Examiner*—Jon Henry
(74) *Attorney, Agent, or Firm*—Dike Bronstein Roberts & Cushman IP Group, Edwards & Angell LLP; David G. Conlin; David A. Tucker

(57) ABSTRACT

In an optical transmit-receive module, an optical fiber plug connected with an optical fiber for optical transmission is removably inserted in a housing. Within the housing, there are provided a branching type light guide, and an optical semiconductor device giving an optical signal to the branching type light guide and receiving an optical signal from the branching type light guide. When the optical fiber plug is inserted in the housing, it is optically connected with the branching type light guide through a light-permeable member having a refractive index approximately equal to refractive indices of the optical fiber and the branching type light guide.

5 Claims, 30 Drawing Sheets

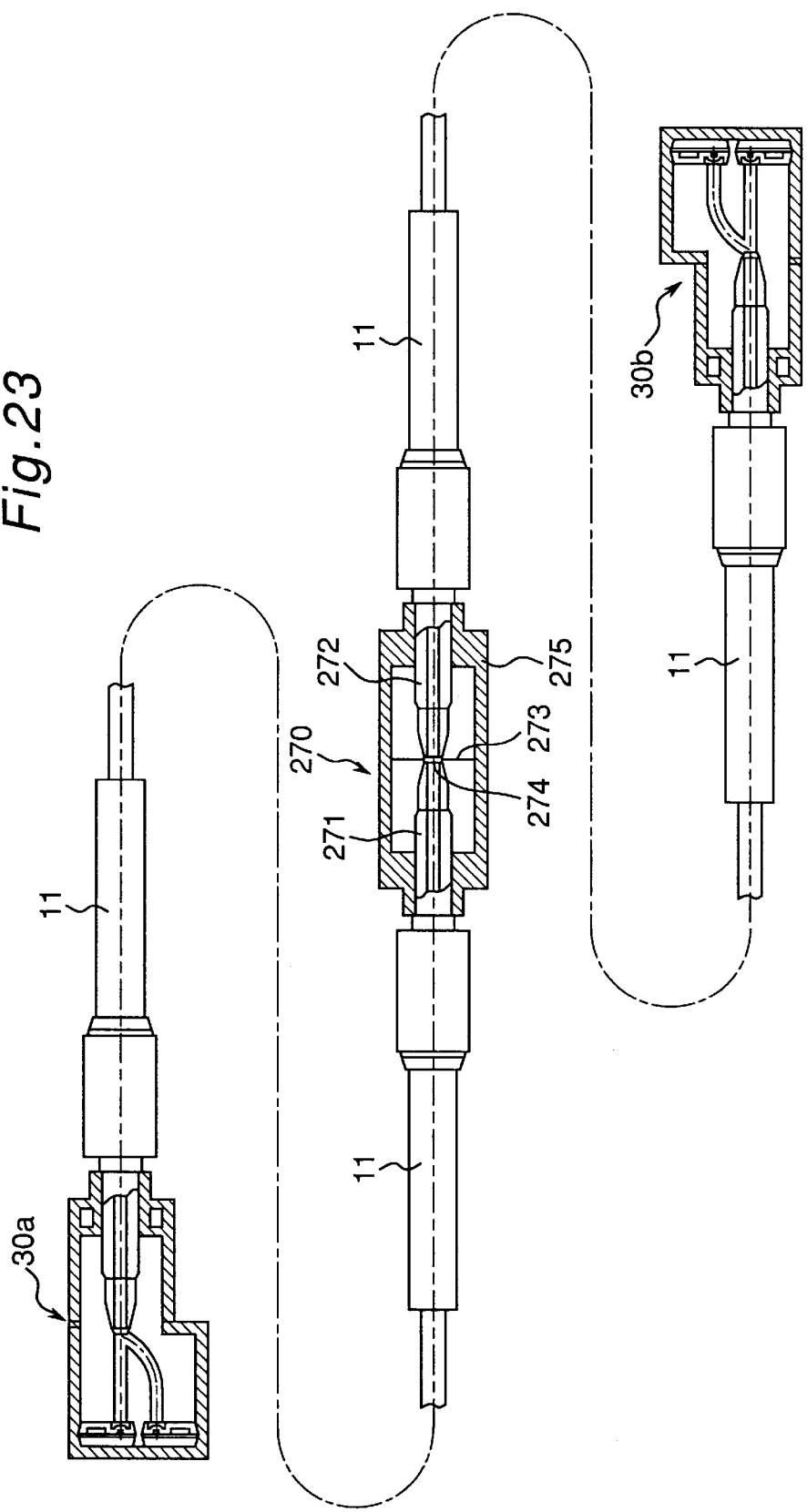

| | Input | Output |
|---|---|---|
| Analog Electrical Signal | LINE IN MIC | LINE OUT HEADPHONE |
| Digital Electrical Signal | Digital Input (Coaxial Input) | Digital Output (Coaxial Output) |
| Digital Optical Signal | Optical Digital Input | Optical Digital Output |

| Type of Plug | Terminal Outputs | | |
|---|---|---|---|
| | V1 | V2 | V3 |
| Analog Electric | L | L | L |
| Digital Electric | L | L | H |
| Digital Optical | L | H | H |
| No Plug | H | H | H |

OPTICAL TRANSMIT-RECEIVE MODULE, OPTICAL TRANSMIT-RECEIVE COUPLER AND OPTICAL TRANSMIT-RECEIVE SYSTEM USING SAME

BACKGROUND OF THE INVENTION

The present invention relates to an optical communications system for performing two-way optical communications between, in particular, digital audio apparatuses and between information-processing apparatuses, and also relates to an optical transmit-receive module and an optical transmit-receive coupler to be used for such an optical communications system.

FIGS. 31A and 31B show conceptual diagrams of a technique disclosed in Japanese Patent Laid-Open Publication No. HEI 6-140106 (Applicant: Sharp Kabushiki Kaisha). This technique is to provide an optical transmit-receive module with a hole that allows a plurality of types of plugs to be commonly inserted, thereby allowing the use of not only an optical fiber plug but also the existing electric plugs. Further, a plurality of electrical connection terminals are provided in the hole, thereby allowing an identical optical transmit-receive module to be used for not only transmission and reception of an optical signal but also transmission and reception of an electrical signal. FIG. 31A shows a case where a miniature single-headed type electric plug (for analog electric use) is inserted in the hole, while FIG. 31B shows the case where an optical fiber plug is inserted in the hole.

In FIG. 31A are shown a miniature single-headed type electric plug 71, terminals 72 for electrical connection, and a light-emitting section 73. An electrical signal applied via the electrical connection use terminal section 72 is transmitted to the electric plug 71 and transmitted to the other end by way of an electric cable connected to the electric plug 71. When the optical transmit-receive module operates in electric use, the light emitting section 73 is in an unoperated state.

In FIG. 31B are shown a light-emitting section 73, an optical fiber section 74 and an optical fiber plug 75. A transmission light emitted from a semiconductor light-emitting chip 74 mounted on the light-emitting section 73 is collected by a lens 75 formed on a surface of an encapsulating resin and made incident on an optical fiber 76. Reference numeral 77 denotes an integrated circuit chip for driving the semiconductor light-emitting chip 74. The optical signal transmitted through the optical fiber 76 is received by an optical transmit-receive module provided on the other end. The optical transmit-receive module on the other end is almost similar to the optical transmit-receive module shown in FIG. 31B, wherein a light-receiving device is used in place of the semiconductor light-emitting chip, and an integrated circuit chip for processing an optical reception signal is used in place of the driving integrated circuit chip. When the optical transmit-receive module operates in optical use, the electrical connection terminals 72 are in an unoperated state.

Connection between the various plugs and the apparatus terminals will be described next. FIG. 32 is an explanatory view for explaining a state in which three identification terminals V1, V2 and V3 are in contact with the connector section, wherein the type of the currently inserted connector section is identified by using potential differences with respect to a reference voltage Vref and a ground GND.

FIG. 34 shows a table indicating correspondence between types of the plugs (connectors) and outputs of the terminals, wherein a great potential difference is indicated by "H" and a small potential difference by "L". The plug is of analog electric use when the terminal outputs V1, V2 and V3 are L, L and L, respectively, the plug is of digital electric use when the outputs are L, L and H, the plug is of digital optical fiber plug use when the outputs are L, H and H, and no plug is inserted when the outputs are H, H and H.

Either the miniature single-headed type electric plug or the optical fiber plug is used as a connector. The miniature single-headed type electric plug includes a plug for analog electrical signal and a plug for digital electrical signal. The optical fiber plug includes a plug for digital optical signal, as shown in FIG. 33. Referring to FIG. 33, in the case of the plug for analog electrical signal, examples of the input side and the output side are LINE IN MIC and LINE OUT HEADPHONE, respectively. In the case of the plug for digital electrical signal, examples of the input side and the output side are a digital input (coaxial input) and a digital output (coaxial output), respectively. In the case of the plug for digital optical signal, examples of the input side and the output side are an optical digital input and an optical digital output, respectively.

In the case of the aforementioned prior art example, unidirectional optical communications have been performed by means of one optical fiber. For the two-way communications, two optical fibers have been necessary. In this case, because of the use of two optical fibers, there has been a problem that installing the fibers and adjusting the optical coupling between the light-receiving devices and light-emitting devices are more difficult than in the case of using a single optical fiber. Furthermore, in order to perform the two-way communications by means of one optical fiber in optical communications using only light, there have been needed an optical branching type light guide and a special light-receiving section and a light-emitting section appropriate for the light guide. In an optical transmit-receive module employing a bifurcated light guide, the bifurcated light guide is designed so as to divide one beam of light into two beams of light or to combine two beams of light into one beam of light, and this has led to a problem that an efficiency in transmitting and receiving light, important for the two-way communications, is degraded.

In Japanese Patent Laid-Open Publication No. HEI 8-130507, an optical transmit-receive module for performing both fiber transmission and optical space transmission was proposed by Sharp Kabushiki Kaisha. This is shown in FIG. 35. In this optical transmit-receive module, an optical signal from a light-emitting section 197 is transmitted to a light-receiving section 199 via an optical guide 198, a space 100 and another optical guide 198 and converted into an electrical signal. The transmission between the optical guide 198 and the optical guide 198 is a spatial transmission by divergent light or parallel light.

In this optical transmit-receive module, the optical guide sections require a space for escaping from front of the light-emitting device or the light-receiving device, and this has led to a problem that the size of the optical module increases.

Furthermore, the fact that the optical incidence diameter is the tip diameter of each optical guide section has led to a problem that the signal light cannot be picked up much, resulting in a reduction in the transmission distance.

There has conventionally been a further problem that dust and dirt tend to adhere to the connection between a light guide and an optical fiber inside an optical transmit-receive module and the connection between an optical fiber and an optical fiber inside an optical transmit-receive coupler.

There has been a further problem that reflected return light increases due to the dust and dirt adhering to a surface of the connection portions between the light guide and the optical fiber inside the optical transmit-receive module and the connection between the optical fiber and the optical fiber inside the optical transmit-receive coupler.

SUMMARY OF THE INVENTION

A primary object of the present invention is to provide an optical transmit-receive module which allows a multiplex type transmission and reception of an optical signal using a single optical fiber cable and a branching type light guide and yet offering an increased efficiency of utilization of light in the optical transmission and reception.

Another object of the present invention is to provide an optical transmit-receive module which facilitates alignment between a branching type light guide and light emitting and receiving devices, which is easy to manufacture, and which can be produced at a low cost.

Another object of the present invention is to provide an optical transmit-receive module that can perform not only optical transmission and reception but also electrical transmission and reception.

Another object of the present invention is to provide an optical transmit-receive module and an optical transmit-receive coupler which can reduce reflected light that tends to occur between an optical fiber plug and a light guide and between optical fiber plugs, respectively, and therefore realizes a fully duplex communication at a low cost and, also to provide an optical transmit-receive system utilizing such optical transmit-receive modules and couplers.

An optical transmit-receive module according to an aspect of the present invention comprises:

- a housing adapted to receive and hold an optical fiber plug connected with an optical fiber;
- an optical semiconductor device provided within the housing for giving an optical signal to the optical fiber and receiving an optical signal from the optical fiber when the optical fiber plug is inserted in the housing; and
- a branching type light guide having at least two branch sections connected with the optical semiconductor device, wherein the branching type light guide is provided in the housing so as to be disposed between the optical semiconductor device and the optical fiber plug inserted in the housing,
- wherein assuming that divergence angles of the two branch sections of the branching type light guide relative to the inserted optical fiber plug are θ1 and θ2, respectively, the divergence angle θ1 is different from the divergence angle θ2 such that the branching type light guide is asymmetrical.

The configuration of the branching type light guide can increase the efficiency of utilization of light in the optical transmission and reception (referred to as "optical transmission and reception efficiency"). Therefore, multiplex type transmission and reception can be realized.

In an embodiment, the branching type light guide is a bifurcated light guide.

In an embodiment, the optical semiconductor device includes a light emitting section and a light receiving section, and one of the two branch sections of the light guide having a smaller divergence angle is associated with the light emitting section while the other of the two branch sections having a larger divergence angle is associated with the light receiving section.

In an embodiment, the optical semiconductor device and the branching type light guide are formed on an identical substrate, and the optical semiconductor device and the branching type light guide have been resin-molded using a same molding die.

In this case, it is possible to fabricate the branching type light guide with precision and at a low cost.

In one embodiment, a unitized light emitting section and a unitized light receiving section are used.

In this case, the module becomes easy to assemble. In addition, adjustment in position between component parts becomes unnecessary. Therefore, a high-precision optical transmit-receive module is produced at a low cost.

In one embodiment, the housing is also adapted to receive and hold a single-headed electric plug, the optical transmit-receive module further comprises a plurality of electrical terminals provided in the housing for giving an electrical signal to the electric plug and receiving an electrical signal from the electrical plug when the electric plug is inserted in the housing.

In this case, by only changing the plugs, the same module is used for the multiplex type transmission and reception of not only an optical signal but also an electrical signal.

In the meantime, if there is a gap (airspace) between the optical fiber plug and the branching type light guide when they are optically connected with each other, there occurs reflection of transmitted light by the airspace. In this case, it is difficult to employ a fully duplex communication system. An optical transmit-receive module according to another aspect of the present invention is is intended to solve this problem. This module comprises:

- a housing;
- an optical fiber plug to be removably inserted in the housing, the optical fiber plug being connected with an optical fiber for optical transmission;
- a branching type light guide provided within the housing;
- an optical semiconductor device provided within the housing for giving an optical signal to the branching type light guide and receiving an optical signal from the branching type light guide; and
- a light-permeable member having a refractive index approximately equal to refractive indices of the optical fiber and the branching type light guide, through which member the optical fiber plug is optically connected with the branching type light guide when inserted in the housing.

With this arrangement, the light-permeable member is in contact with the optical fiber plug and the branching type light guide while they are optically connected with each other. Accordingly, the airspace between the optical fiber plug and the branching type light guide can be substantially eliminated. In addition, the refractive index of the light-permeable member is approximately equal to the refractive indices of the optical fiber and the branching type light guide. Therefore, it is difficult for reflected light to be generated at an interface between the optical fiber and the light-permeable member and between the light guide and the light-permeable member. As a result, reflected light between the optical plug and the light guide is considerably reduced. This enables a fully duplex communication system.

In one embodiment, the light-permeable member includes two parts fixed to a tip of the optical fiber and a tip of the branching type light guide, respectively, and has a hardness higher than a hardness of the optical fiber and a hardness of the branching type light guide.

In this case, due to the hardness of the light-permeable member larger than that of the optical fiber and the light guide, the tips of the optical fiber and the light guide hardly suffer scratches that would be caused by repeated inserting, removing and rotating operations of the optical plug, even if the optical fiber and the light guide are made of resin materials. Thus, the life of an optical transmit-receive system using this module is prolonged.

In one embodiment, the light-permeable member is made of an elastic material.

If fine particles of dust and dirt are present at a connection portion between the optical fiber and the light guide, the light-permeable member deforms due to its elasticity and disperses stress caused by such dust and dirt. Therefore, the light-permeable member is hardly damaged. Even if the light-permeable member suffers minute scratches so that its surface becomes uneven, the surface unevenness deforms when the optical plug is inserted into the housing and contacts the light-permeable member. As a result, airspaces due to the surface unevenness disappear and reflected light which would be caused by such airspace is eliminated.

In one embodiment, the light-permeable member is made of a gel material.

In this case, even if there is a minute scratch, dust or dirt on the surface of the light-permeable member, a liquid component contained in the gel material such as water or oil serves to fill the unevenness of the surface. Therefore, reflected light between the optical plug and the branching type light guide reduces.

In one embodiment, the light-permeable member is placed on a diaphragm.

In this case, the position of the light-permeable member can be changed largely by whether the optical plug is present or not in the housing and also by the outer shape of the plug. Therefore, the degree of freedom in designing the optical transmit-receive module increases. Also, it becomes possible to use the light-permeable member as a double-sided lens to thereby increase the light utilization efficiency.

In one embodiment, the light-permeable member has electrical conductivity and is grounded.

In this case, this structure can escape static electricity generated in a contact portion when inserting and pulling out the optical fiber plug. Therefore, this structure prevents adhesion of dust and dirt.

In one embodiment, a light absorbing material is provided around an outer circumference of the light-permeable member.

The light absorbing material absorbs reflected return light generated within the light-permeable member. Therefore, it is possible to reduce the reflected return light.

In one embodiment, a taper angle $\theta$ ($\theta>0$) is formed in a state that the optical fiber plug abuts against the light-permeable member and/or in a state that the branching type light guide abuts against the light-permeable member.

This structure suppresses reflected return light generated at an abutment surface of the light-permeable member.

In one embodiment, a structure for removing reflected return light that is transmitted with a diameter larger than a numerical aperture (NA) is provided in a position as close to an output end of the optical fiber as possible.

This structure effectively removes cladding mode, i.e., light transmitted through a cladding portion of the optical fiber. Thus, reflected return light decreases.

An optical transmit-receive coupler according to still another aspect of the present invention comprises:

a housing;

two optical fiber plugs to be removably inserted in the housing, each optical fiber plug being connected with an optical fiber for optical transmission;

a light-permeable member having a refractive index approximately equal to a refractive index of the optical fiber, through which member the optical fiber plugs are optically connected with each other when inserted in the housing.

With this arrangement, the light-permeable member is in contact with both optical fiber plugs while they are optically connected with each other. Accordingly, there is substantially no airspace between the optical fiber plugs. In addition, the refractive index of the light-permeable member is approximately equal to the refractive index of the optical fiber. Therefore, it is difficult for reflected light to be generated at interface between the optical fiber and the light-permeable member. This enables a fully duplex communication system.

The present invention also provides an optical transmit-receive system comprising the optical transmit-receive module as described above and the transmit-receive coupler as described above.

This optical transmit-receive system can adopt a fully duplex communication system even using a commercially available common optical fiber cable. This system can transmit more than twice as much information as information that a semi duplex communication system can transmit.

Further objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 23 is a view showing an optical transmit-receive system according to a fourteenth embodiment of the present invention;

DETAILED DESCRIPTION OF THE PREFERRED EMBODIMENTS

First Embodiment

Figure 1A:
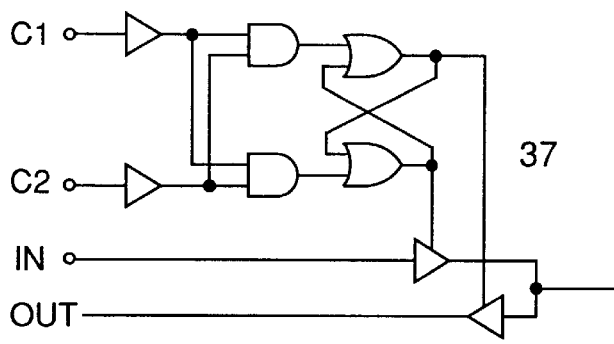
FIG. 1A is an illustration for explaining the operation of an optical transmit-receive system employing an optical transmit-receive module according to a first embodiment of the present invention.
Figure 1B:
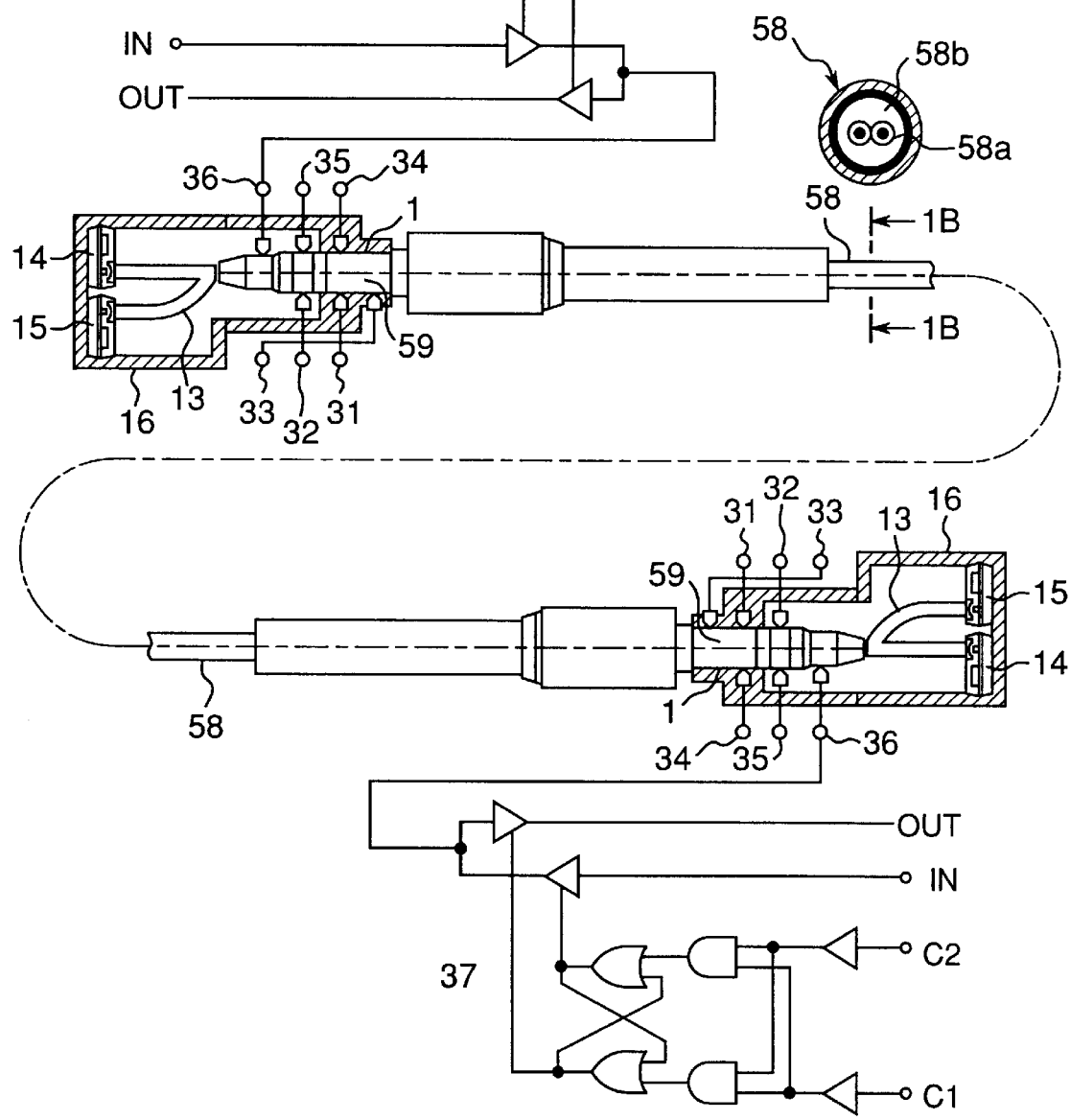
FIG. 1B is a sectional view taken along the line 1B—1B in FIG. 1A.

An optical transmit-receive module according to a first embodiment of the present invention is shown in FIGS. 1A and 1B. This optical transmit-receive module is applied to a plug-jack type combined optical and electrical transmission apparatus that employs either a miniature single-headed type electric plug or an optical fiber plug for a connector section 1 of the module. The miniature single-headed type electric plug includes plugs for analog electric use and digital electric use, while the optical fiber plug is for digital optical use. By discriminating the shape of the plug, the module is used as an electric transmission apparatus or an optical transmission apparatus. In this case, identical optical transmit-receive modules are used.

FIG. 1A is a diagram in which a miniature single-headed type electric plug is inserted in the connector section 1. The optical transmit-receive module shown in FIG. 1A includes an electric cable 58, a miniature single-headed type electric plug 59, a bifurcated type light guide 13, a mold-packaged light-emitting section 14, a mold-packaged light-receiving section 15, a housing 16 having the connector section 1, terminals for electrical connection (referred to as "electrical connection terminals") 31 through 36, and an electric control circuit 37. The electric control circuit 37 has an input terminal IN, an output terminal OUT and control terminals C1 and C2. An electric transmission signal from the input terminal IN is electrically connected to the electrical connection terminal 36 via an amplifier circuit, and then to the electric plug 59. The other electrical connection terminals 31 through 35 are each used when needed. As shown in the sectional view of FIG. 1B, the electric cable 58 has central wires 58a and an insulating cover 58b around the central wires. A case where an optical fiber plug is inserted in the connector section 1 of the optical transmit-receive module of the first embodiment of the present invention will be described later with reference to FIG. 3.

(Bifurcated Light Guide)

The following describes optical simulation results concerning the divergence angle of the bifurcated light guide 13 for use in the optical transmit-receive module of the first embodiment.

Figure 2A:
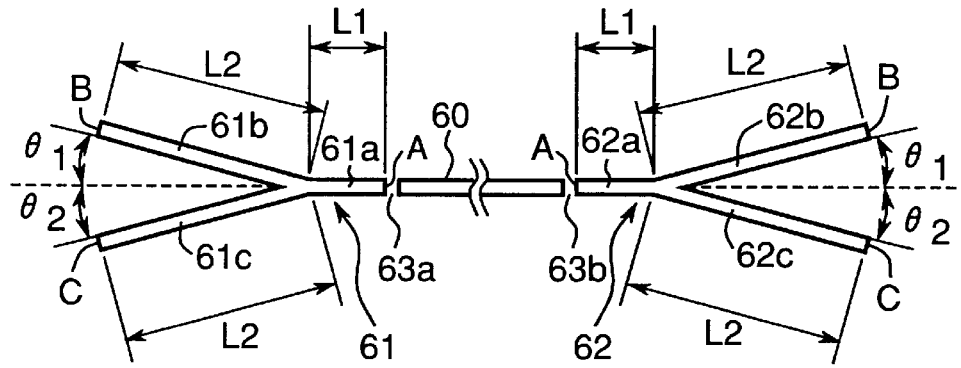
FIG. 2A is an illustration showing a bifurcated light guide applied to the optical transmit-receive module.

FIG. 2A shows the shape of the bifurcated light guide, used in the optical simulation, for use in the optical transmit-receive module. At both ends of an optical fiber cable 60 are arranged bifurcated light guides 61 and 62 via small gaps 63a and 63b, respectively. The bifurcated light guide 61 is constructed of three parts of a linear section 61a, a branch section 61b and a branch section 61c. It is assumed that a divergence angle between the linear section 61a and the branch section 61b is θ1, that a divergence angle between the linear section 61a and the branch section 61c is θ2, that the length of the linear section 61a is L1, that the length of the branch section 61b is L2, and that the length of the branch section 61c is L2. The bifurcated type light guide 61 and the bifurcated type light guide 62 are formed to have similar figures, and it is assumed that a divergence angle between the linear section 62a and the branch section 62b is θ1, that a divergence angle between the linear section 62a and the branch section 62c is θ2, that the length of the linear section 62a is L1, that the length of the branch section 62b is L2, and that the length of the branch section 62c is L2. It is also assumed that the linear section 61a and the linear section 62a have an end face A, that the branch section 61b and the branch section 62b have an end face B, and that the branch section 61c and the branch section 62c have an end face C.

The optical simulation results using the bifurcated type light guide shown in FIG. 2A are shown in Table 1.

TABLE 1

| L1 mm | L2 mm | θ1 (°) | θ2 (°) | Optical Transmission Rate (%) η (A←→B) | Optical Transmission Rate (%) η (A←→C) | Optical Transmission and Reception Efficiency (%) η |
|---|---|---|---|---|---|---|
| 5 | 15 | 15 | 0 | 61 | 93 | 57 |
| 5 | 15 | 15 | 5 | 70 | 73 | 51 |
| 5 | 15 | 15 | 10 | 78 | 59 | 46 |
| 5 | 15 | 15 | 15 | 88 | 49 | 43 |
| 5 | 15 | 30 | 0 | 83 | 77 | 64 |
| 0 | 15 | 15 | 0 | 68 | 97 | 66 |

In Table 1, the optical transmission rate between end face A and the end face B is expressed as η(A←→B), the optical transmission rate between the end face A and the end face C is expressed as η(A←→C), and a product [η(A←→B)]×[η(A←→C)] of the optical transmission ratio η(A←→B) and the optical transmission ratio η(A←→C) is called "efficiency of utilization of light in optical transmission and reception (referred to as simply "optical transmission and reception efficiency" here) η".

As shown in Table 1, when L1=5 mm, L2=15 mm, θ1=15° and θ2=0°, η(A←→B)=61%, η(A←→C)=93% and the optical transmission and reception efficiency η=57%. Likewise, when L1=5 mm, L2=15 mm and θ1=15°, η(A←→B) =70%, 78% and 88%, η(A←→C)=73%, 59% and 49% and the optical transmission and reception efficiency η=51%, 46% and 43% with respect to θ2=5°, 10° and 15°, respectively. When L1=5 mm, L2=15 mm, θ1=30° and θ2=0°, η(A←→B)=83%, η(A←→C)=77% and the optical transmission and reception efficiency η=64%. When L1=0 mm, L2=15 mm, θ1=15° and θ2=0°, η(A←→B)=68%, η(A←→C)=97% and the optical transmission and reception efficiency η=66%.

Figure 2B:
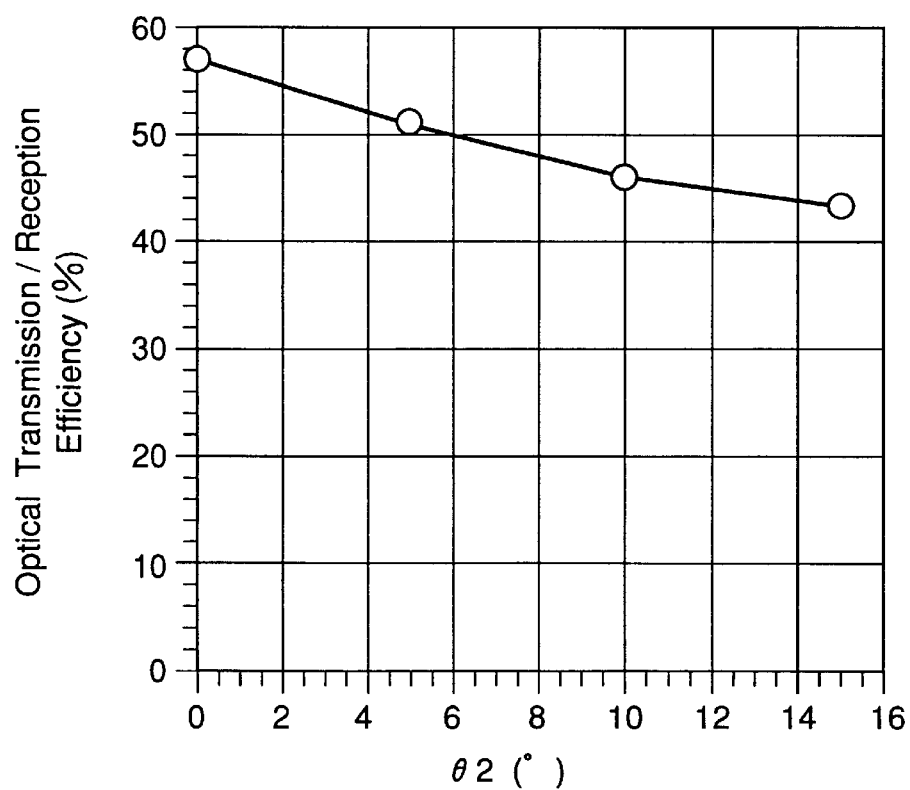
FIG. 2B is a graph for explaining a relation between a divergence angle $\theta 1$ and efficiency of utilization of light in optical transmission and reception (optical transmission and reception efficiency)

Next, FIG. 2B shows the results, listed in Table 1, obtained under the conditions that L1=5 mm, L2=15 mm and θ1=15°, in which θ2 (°) is plotted on the horizontal axis, and the optical transmission and reception efficiency η (%) is plotted on the vertical axis. FIG. 2B shows that the optical transmission and reception efficiency η depends largely on the divergence angle θ2 between the linear section and the branch section of the bifurcated type light guide and that the optical transmission and reception efficiency η increases as the divergence angle θ2 decreases. In order to obtain the optical transmission and reception efficiency η of 40% or more, the divergence angle θ2 between the linear section and the branch section must be 15° or smaller and, preferably, the divergence angle θ2 should be 7° or smaller, according to the figure. Although θ2>0° in FIG. 2A, it is practically acceptable to take a value of θ2<0°, when θ2 is on the θ1 side.

In Table 1, the optical transmission and reception efficiency η=66% when the length L1 of each of the linear sections 61a and 62a is L1=0 mm, and the optical transmission and reception efficiency η=57% when L1=5 mm, indicating that the optical transmission and reception efficiency η becomes greater when L1=0 mm than in the other case. The setting of L1=0 mm means that the optical fiber plug reaches the diverging point of the light guide. Therefore, the divergence angle θ1 can be defined as either "divergence angle between the linear section and the first branch section" or "divergence angle between the optical fiber plug and the first branch section". Similarly, the divergence angle θ2 can be defined as "divergence angle between the linear section and the second branch section" or "divergence angle between the optical fiber plug and the second branch section".

Second Embodiment

Figure 3A:
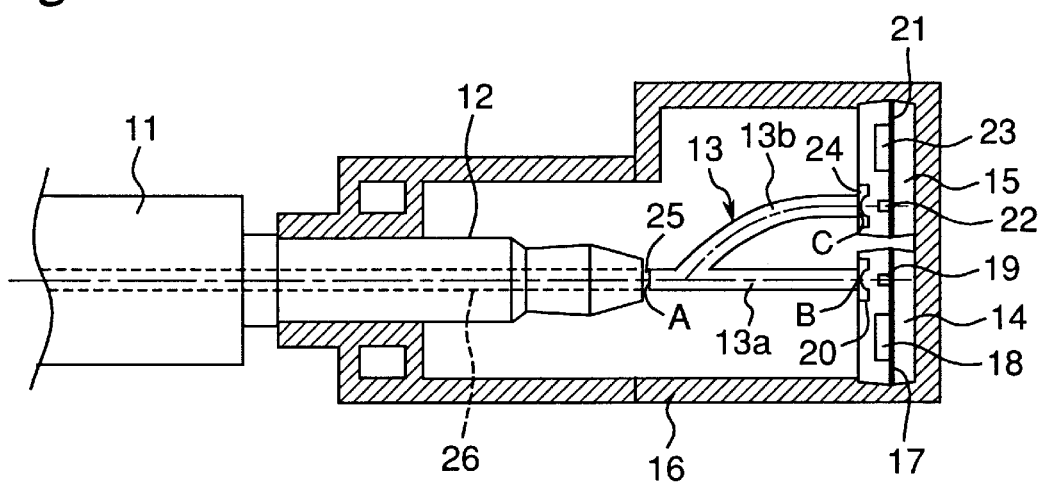
FIGS. 3A and 3B are sectional views showing the internal structure, as viewed from above and from a lateral side, respectively, of an optical transmit-receive module according to a second embodiment, where an optical fiber plug is inserted in a connector section.
Figure 3B:
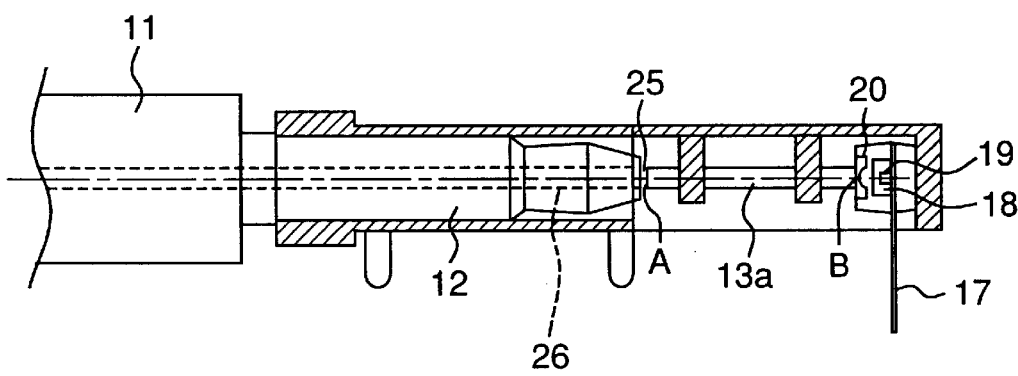

An optical transmit-receive module according to a second embodiment of the present invention is shown in FIGS. 3A and 3B.

In these figures, components similar to the components shown in FIG. 1A are denoted by the same reference numerals.

In FIG. 3A, the optical transmit-receive module is constructed essentially of an optical fiber section 11, an optical fiber plug 12, a bifurcated type light guide 13 having branch sections 13a and 13b, a mold-packaged light-emitting section 14, a mold-packaged light-receiving section 15 and a housing 16 for housing the optical fiber plug 12, bifurcated type light guide 13, light-emitting section 14 and light-receiving section 15.

The mold-packaged light-emitting section 14 is provided with a semiconductor light-emitting device 19 and a driving integrated circuit chip 18 for processing a transmission signal and driving the semiconductor light-emitting device, both of which are mounted on a lead frame 17 having an input terminal, together with a condenser lens 20. On the other hand, the mold-packaged light-receiving section 15 is provided with a light-receiving device 22 for receiving a reception signal and converting the signal into an electrical signal and an amplifying integrated circuit chip 23 for processing the reception signal and outputting the resulting signal, both of which are mounted on a lead frame 21 having an output terminal, together with a condenser lens 24. Then, the optical transmit-receive module is roughly divided into the following two parts: a removable part including the optical fiber section 11 and the optical fiber plug 12, and a fixed part including the bifurcated type light guide 13, light-emitting section 14, light-receiving section 15 and housing 16.

Operation in the transmission stage will be described. A transmission signal is inputted to the lead frame 17 having the input terminal, transmitted to the driving integrated circuit chip 18, converted into an electrical signal for driving the semiconductor light-emitting device and applied to the semiconductor light-emitting device 19. The transmission signal converted into light by the semiconductor light-emitting device 19 is made incident on the end face B of one branch section 13a of the bifurcated type light guide 13 via the condenser lens 20, transmitted through the branch section 13a while being totally reflected by its inner surface, and then ejected from the end face A. The outgoing light is made incident on an optical fiber 26 provided in the optical fiber plug 12 via a minute gap (of about 0.1 mm, for example) 25. The optical fiber 26 is integrated with the optical fiber section 11, and the optical transmission signal is transmitted through the optical fiber section 11 and guided to another bifurcated type light guide provided at the other end.

Operation in the reception stage will be described next. The optical reception signal is transmitted through the optical fiber 26 of the optical fiber section 11, made incident on the end face A of the other branch section 13b of the bifurcated type light guide 13 from the optical fiber 26 of the optical fiber plug 12 via the minute gap (of about 0.1 mm, for example) 25, transmitted through the branch section 13b and radiated from the end face C. The radiated light is condensed by the condenser lens 24 of the light-receiving section 15, and the optical reception signal is guided to the light-receiving device 22 and converted into an electric reception signal. The converted electric reception signal is processed by the amplifying integrated circuit chip 23 and outputted outwardly through the output terminal of the lead frame 21.

By thus using the bifurcated type light guide 13, a duplex type optical transmit-receive module can be implemented. By using a trifurcated type light guide or a multi-furcated type light guide instead of the bifurcated type light guide 13, a multiplex type optical transmit-receive module can be realized.

Third Embodiment

Figure 4A:
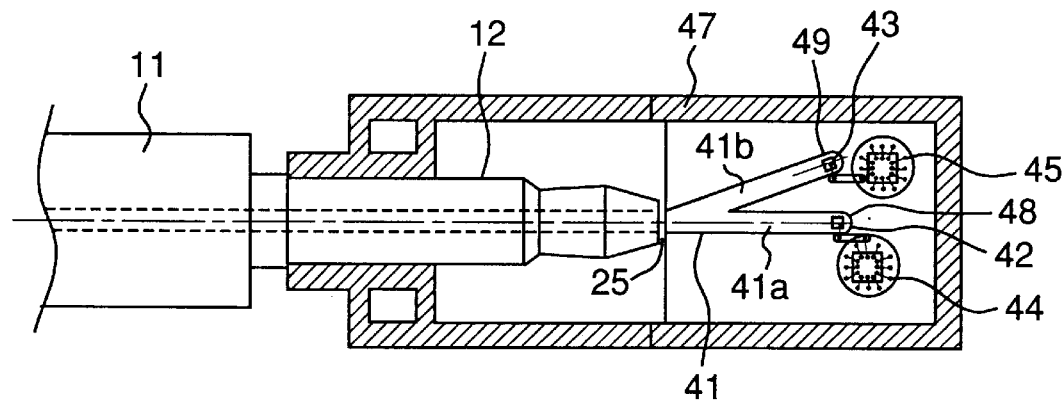
FIGS. 4A and 4B are sectional views showing the internal structure, as viewed from above and from a lateral side, respectively, of an optical transmit-receive module according to a third embodiment.
Figure 4B:
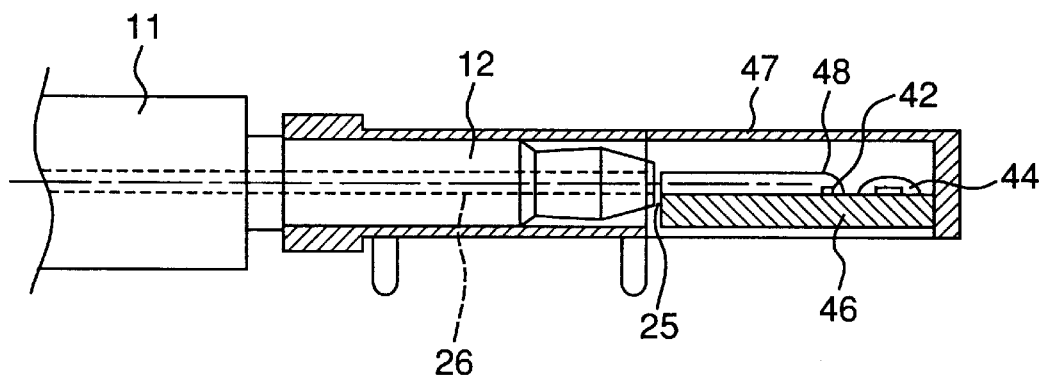

An optical transmit-receive module according to a third embodiment of the present invention is shown in FIGS. 4A and 4B. In these figures, components similar to the components shown in FIGS. 3A and 3B are denoted by the same reference numerals.

In FIGS. 4A and 4B, the optical transmit-receive module is constructed of an optical fiber section 11, an optical fiber plug 12, a bifurcated type light guide 41, a semiconductor light-emitting device 42 embedded in one branch section 41a of the bifurcated type light guide 41, a light-receiving device 43 embedded in the other branch section 41b of the bifurcated type light guide 41, a driving integrated circuit chip 44 for processing a transmission signal and driving the semiconductor light-emitting device, an amplifying integrated circuit chip 45 for processing a reception signal and outputting the resulting signal, a printed wiring board 46 mounted with the bifurcated type light guide 41, the semiconductor light-emitting device 42 and the light-receiving device 43, and a housing 47 that houses these components. The semiconductor light-emitting device 42 and the light-receiving device 43 are electrically connected to the driving integrated circuit chip 44 and the amplifying integrated circuit chip 45, respectively. Then, the optical transmit-receive module is roughly divided into two parts: a removable part comprised of the optical fiber section 11 and the optical fiber plug 12 and a fixed part comprised of the bifurcated type light guide 41, semiconductor light-emitting device 42, light-receiving device 43, driving integrated circuit chip 44, amplifying integrated circuit chip 45, printed wiring board 46 and housing 47.

Operation of the optical transmit-receive module of the third embodiment will be described mainly on the basis of the parts that operate differently from the optical transmit-receive module of the second embodiment. First, operation in the transmission stage will be described. A transmission signal light emitted from the semiconductor light-emitting device 42 is totally reflected by the surface of a resin molded portion 48 covering the semiconductor light-emitting device 42 (or reflected by a metal film plating formed on the board surface), deflected at an angle of 90° in terms of optical axis and then made incident on one branch section 41a of the bifurcated type light guide 41. The resin-molded portion 48 has a concave mirror surface and has a function corresponding to the condenser lens 20 of the optical transmit-receive module of the second embodiment. The optical signal incident on the branch section 41a is made incident on the optical fiber 26 provided within the optical fiber plug 12 via a minute gap (of about 0.1 mm, for example) 25. The optical fiber 26 is integrated with the optical fiber section 11, and the optical transmission signal is transmitted through the optical fiber section 11 and guided to the bifurcated type light guide provided at the other terminal end.

Operation in the reception stage will be described next. The reception operation is almost similar to the operation in the transmission stage. The optical reception signal transmitted through the other branch section 41b of the bifurcated type light guide 41 is totally reflected by a surface forming a concave mirror of a resin molded portion 49 covering the light-receiving device 43 (or reflected by a metal film plating formed on the board surface), deflected at an angle of 90° in terms of optical axis and then guided to the light-receiving device 43. An electrical reception signal from the light-receiving device 43 is processed by the amplifying integrated circuit chip 45 and outputted outwardly through the output terminal.

A method of manufacturing the bifurcated type light guide 41, semiconductor light-emitting device 42, light-receiving device 43, driving integrated circuit chip 44, amplifying integrated circuit chip 45, and so forth on the printed wiring board 46 will be described next with reference to FIGS. 5A, 5B, 8A and 8B.

The printed wiring board 46 is prepared by forming a copper foil layer on a substrate formed of a glass epoxy plate or an injection molded liquid crystal polymer, patterning the copper foil by chemical etching and providing a plated wiring of gold plating or the like when needed. Although the printed wiring board 46 is taken as an example in this case for the description, it is also acceptable to employ a material such as ceramics and glass and form a wiring circuit or a chip pad by silk screen printing or the like.

Figure 5A:
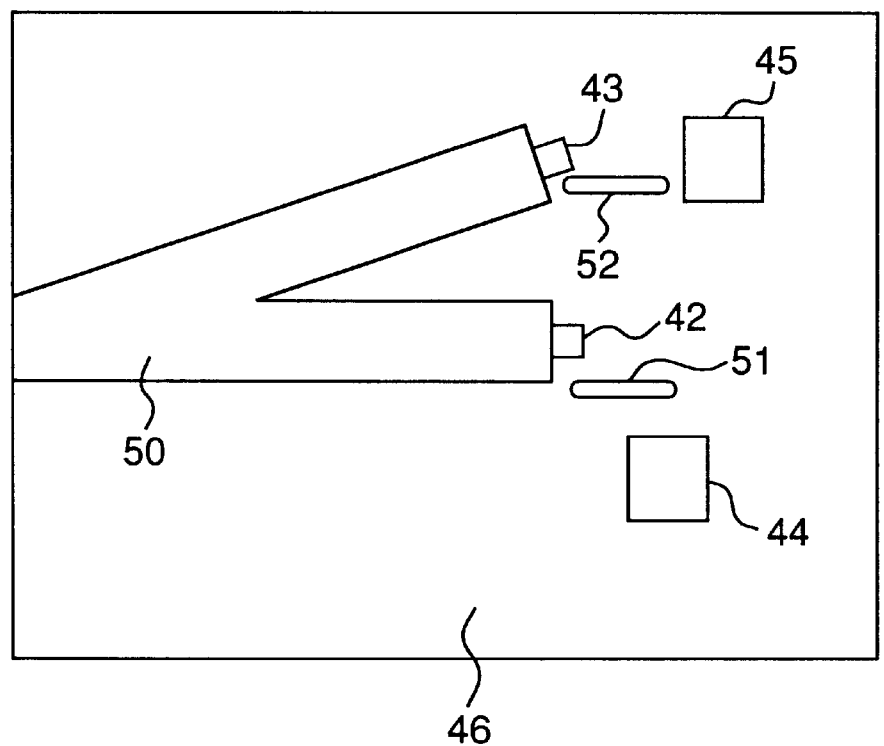
FIGS. 5A and 5B are plan and sectional views, respectively, showing a die bonding process step in manufacturing the optical transmit-receive module of the third embodiment.
Figure 5B:
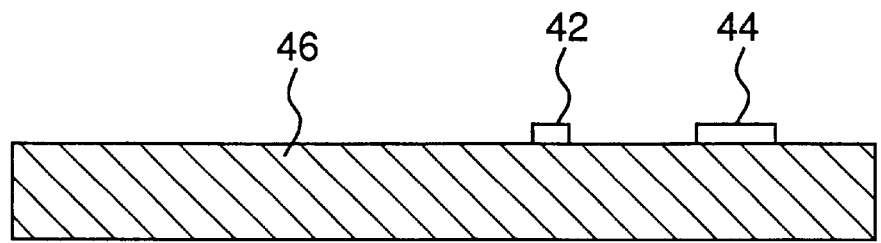

FIGS. 5A and 5B show a die bonding process step. There are wiring patterns 51 and 52 on the printed wiring board 46, and the semiconductor light-emitting device 42, light-receiving device 43, driving integrated circuit chip 44 and amplifying integrated circuit chip 45 are die bonded by a conductive adhesive (silver paste, for example). Reference numeral 50 denotes a region in which the bifurcated type light guide 41 is formed.

Figure 6A:
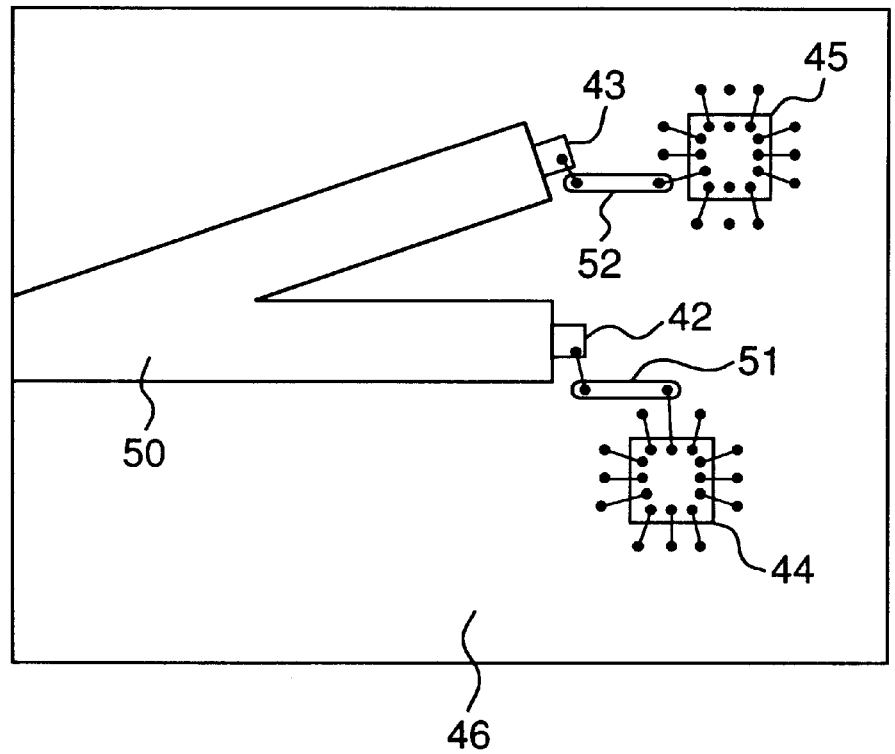
FIGS. 6A and 6B are plan and sectional views, respectively, showing a wire bonding process step in manufacturing the optical transmit-receive module of the third embodiment.
Figure 6B:
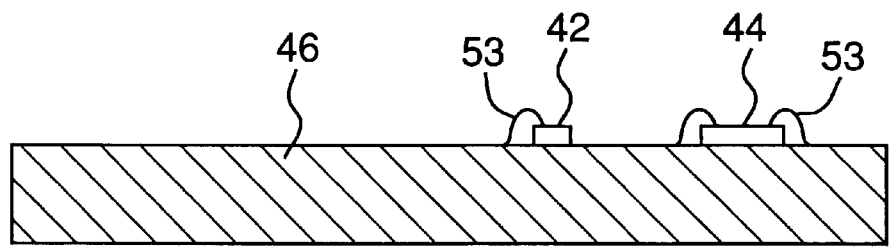

FIGS. 6A and 6B show a wire bonding process step. The semiconductor light-emitting device 42 and the driving integrated circuit chip 44 are wire bonded by a gold wire 53 via the wiring pattern 51, while the light-receiving device 43 and the amplifying integrated circuit chip 45 are wire bonded by a gold wire 53 via the wiring pattern 52. The driving integrated circuit chip 44 and the amplifying integrated circuit chip 45 are wire bonded by gold wires 53 to wiring patterns (not shown) on the printed wiring board 46. The wire bonding achieves required electrical connections.

Figure 7A:
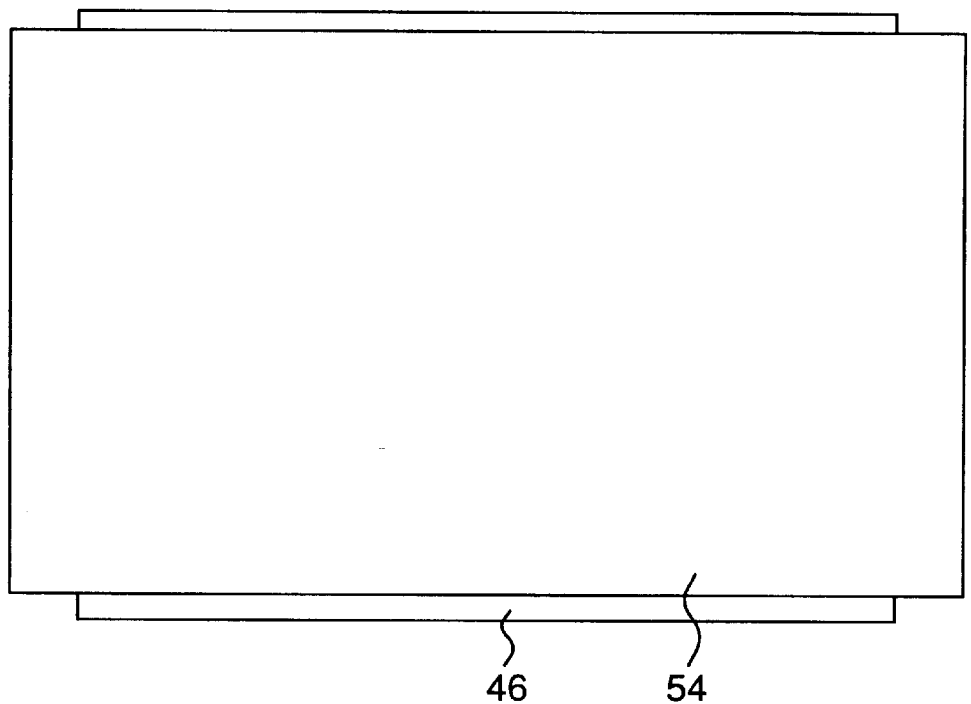
FIGS. 7A and 7B are plan and sectional views, respectively, showing a transfer molding process step in manufacturing the optical transmit-receive module of the third embodiment.
Figure 7B:
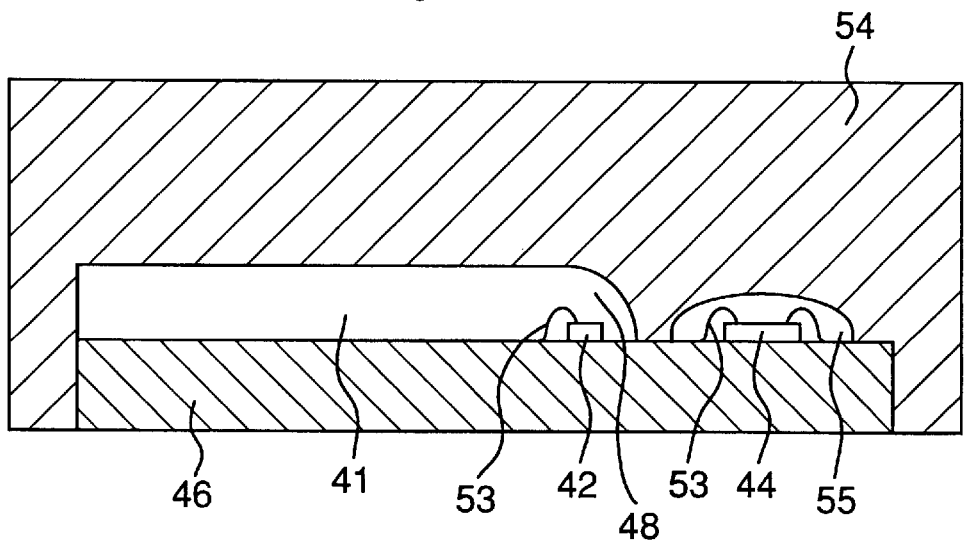

FIGS. 7A and 7B show a transfer molding process step. A metal mold 54 is pressed against the printed wiring board 46, a light-permeable resin is injected into a space of the metal mold, and this metal mold is removed after the hardening of the resin. In FIG. 7B, reference numeral 55 denotes a resin molded section for covering the driving integrated circuit chip 44.

Figure 8A:
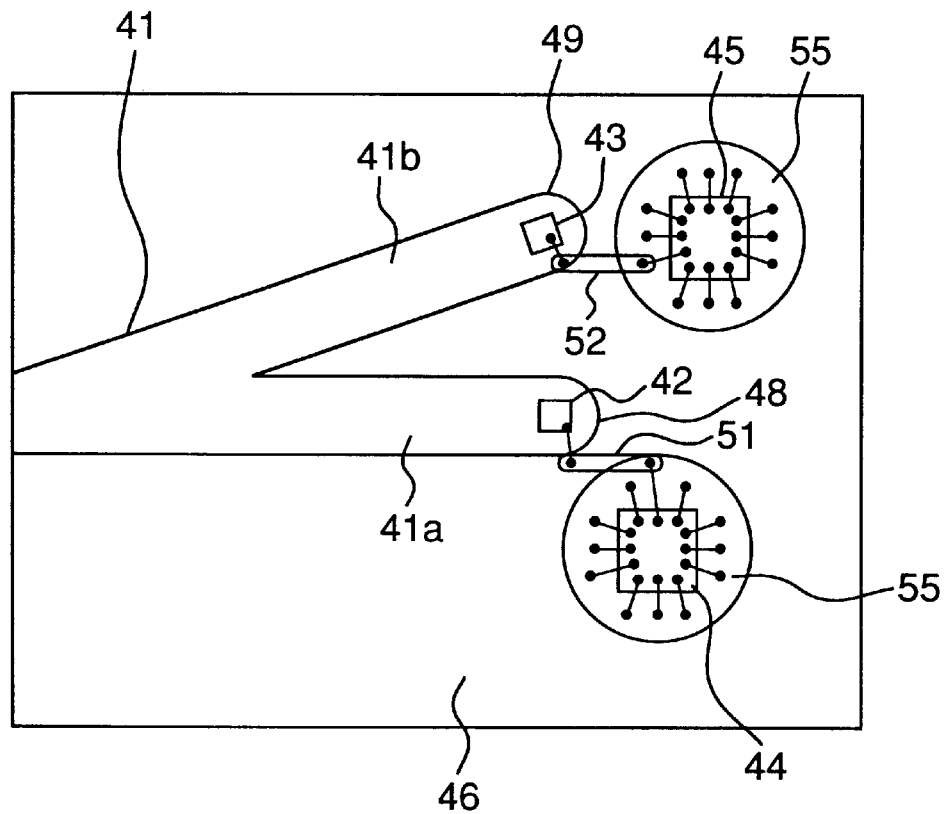
FIGS. 8A and 8B are plan and sectional views, showing essential parts of the optical transmit-receive module of the third embodiment manufactured through the above process steps.
Figure 8B:
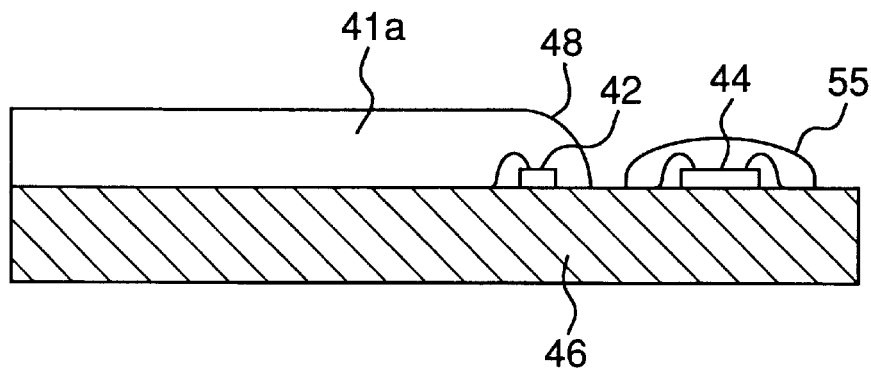

FIGS. 8A and 8B show the arrangement of the optical transmit-receive module on the printed wiring board 46.

The following describes optical transmit-receive modules wherein both a miniature single-headed type electric plug and an optical fiber plug can be selectively inserted into the connection section of the housing in a removable manner, with reference to FIGS. 9A, 9B and 9C to FIGS. 11A, 11B and 11C.

Figure 9A:
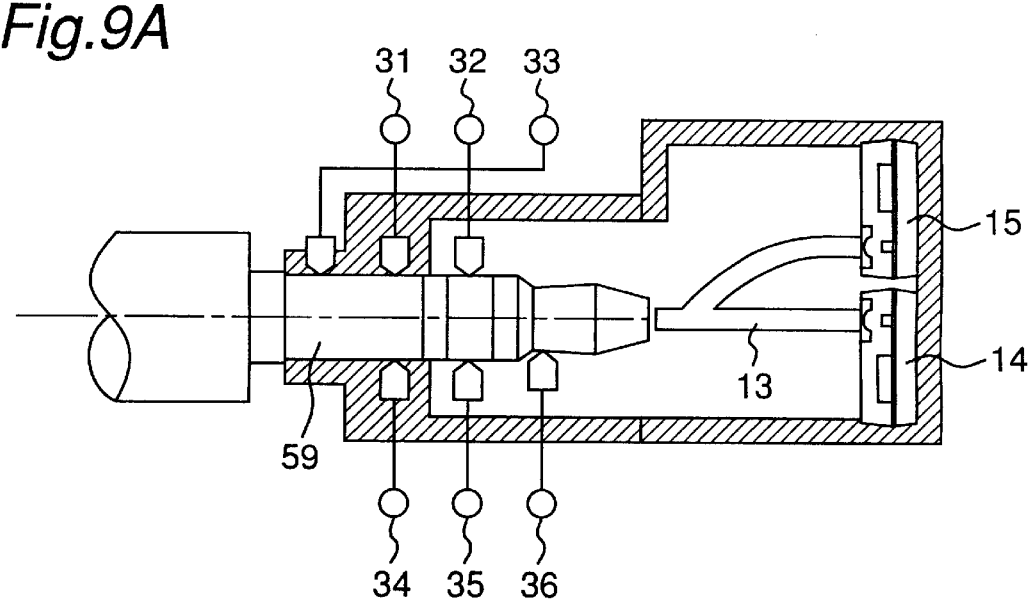
FIGS. 9A, 9B and 9C are views showing a modification example employing a bifurcated type light guide having a linear section, in a case where a miniature single-headed type electric plug is inserted in a connector section, in a case where an optical fiber plug is inserted, and in a case where nothing is inserted in the connector section, respectively.
Figure 9B:
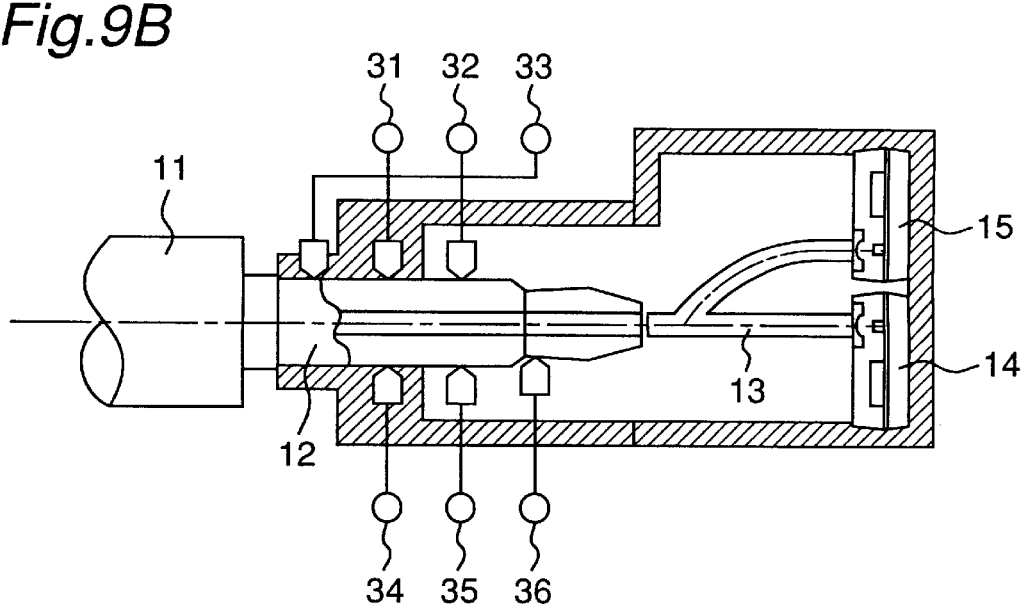
Figure 9C:
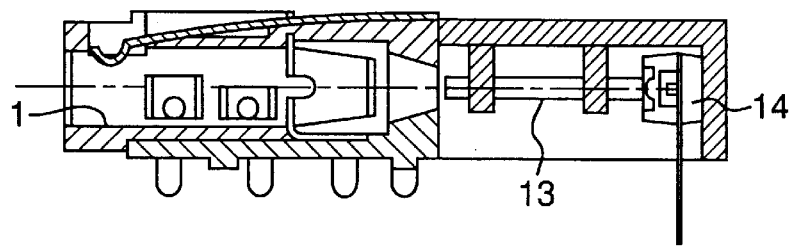

FIGS. 9A, 9B and 9C show different states of an optical transmit-receive module in a case where the bifurcated type light guide 13 has a linear section. FIG. 9A shows a case where a miniature single-headed type electric plug (for analog electrical signal) is inserted in the connector section 1. FIG. 9B shows a case where an optical fiber plug is inserted in the connector section 1. FIG. 9C shows a case where nothing is inserted in the connector section 1. Although not shown, a miniature single-headed type electric plug for digital electrical signal can also be used. As is obvious, an optical transmit-receive module capable of performing the transmission and reception of an electrical signal and an optical signal can be achieved merely by changing the plugs (a removable part) and using the identical fixed part.

Figure 10A:
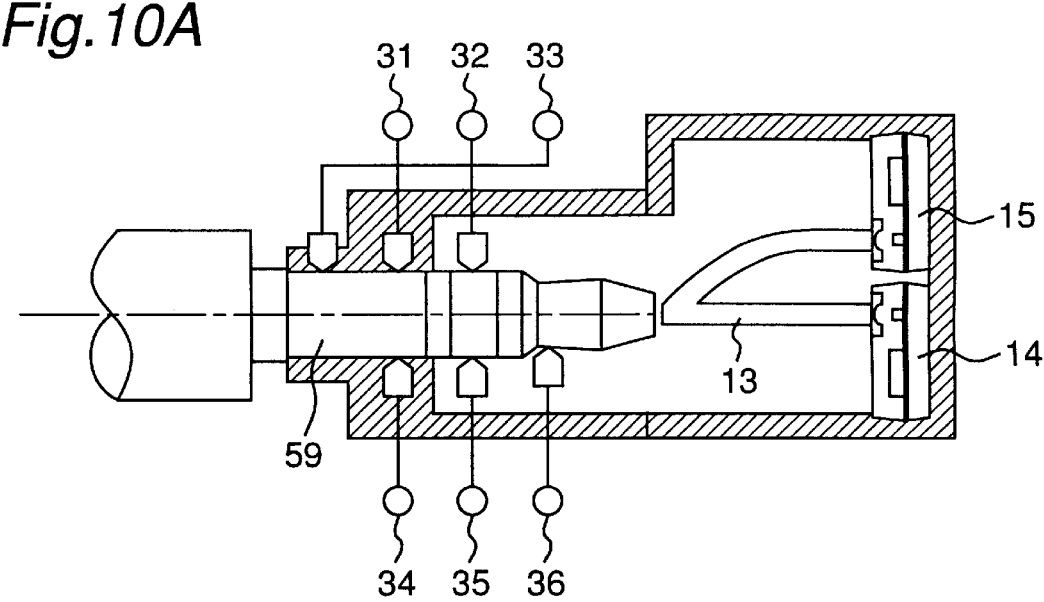
FIGS. 10A, 10B and 10C are views showing another modification example employing a bifurcated type light guide having no linear section, in a case where a miniature single-headed type electric plug is inserted in the connector section, in a case where an optical fiber plug is inserted, and in a case where nothing is inserted in the connector section, respectively.
Figure 10B:
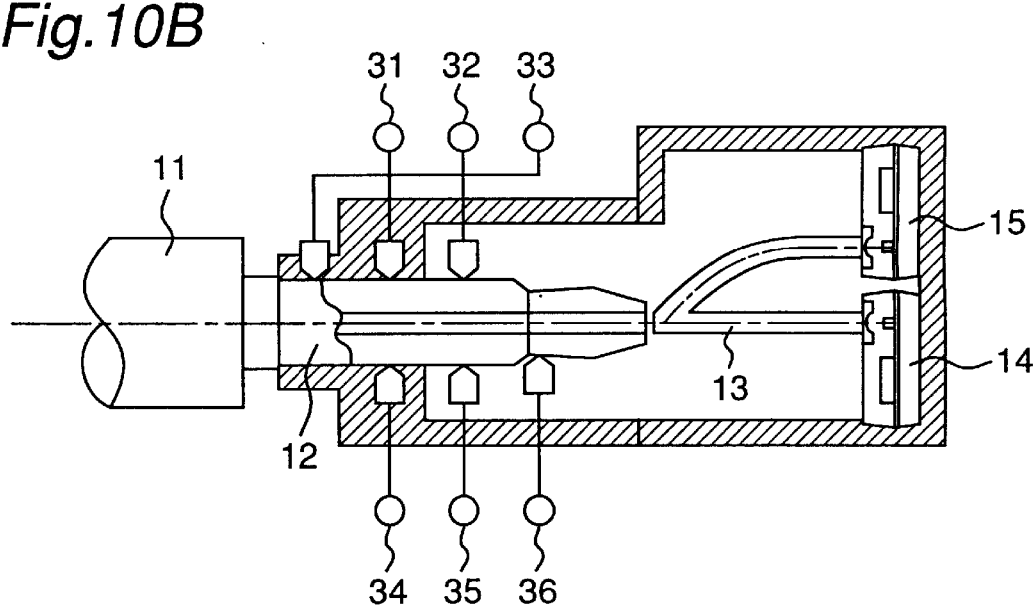
Figure 10C:
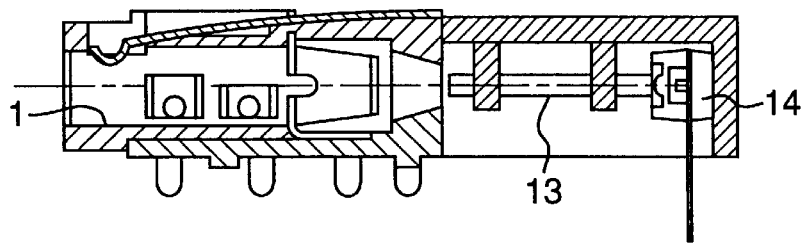

FIGS. 10A, 10B and 10C show different states of an optical transmit-receive module in a case where the bifurcated type light guide 13 has no linear section. FIG. 10A shows a case where a miniature single-headed type electric plug (for analog electrical signal) is inserted in the connector section 1. FIG. 10B shows a case where an optical fiber plug is inserted in the connector section 1. FIG. 10C shows a case where nothing is inserted in the connector section 1.

Figure 11A:
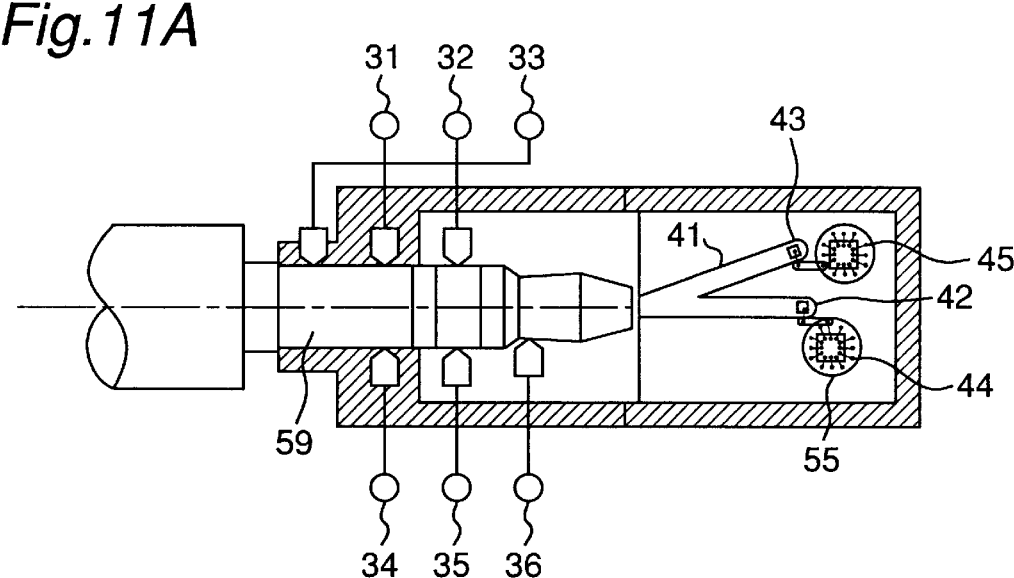
FIGS. 11A, 11B and 11C are views showing an embodiment employing a bifurcated type light guide manufactured by the transfer molding process, in a case where a miniature single-headed type electric plug is inserted in a connector section, in a case where an optical fiber plug is inserted, and in a case where nothing is inserted in the connector section, respectively.
Figure 11B:
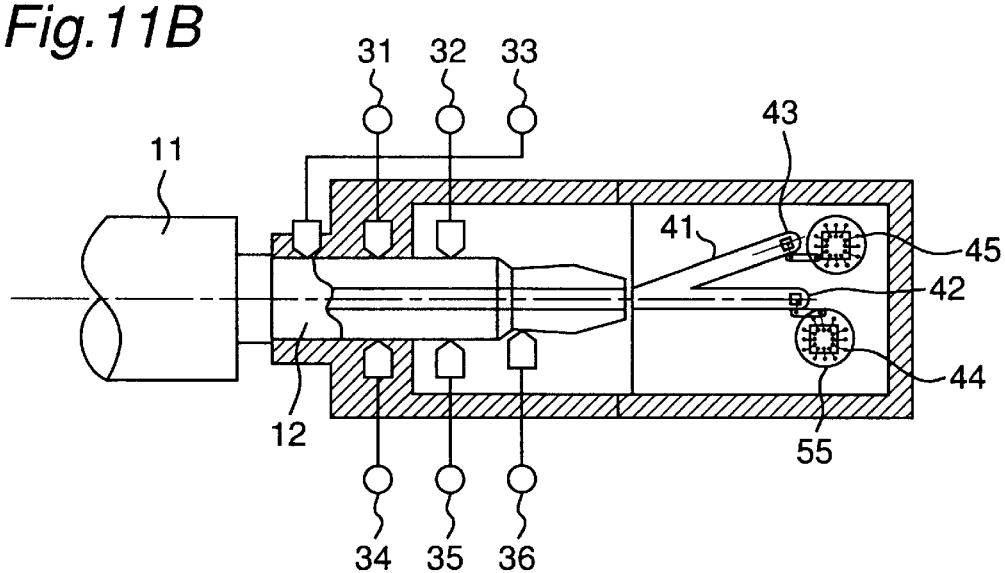
Figure 11C:
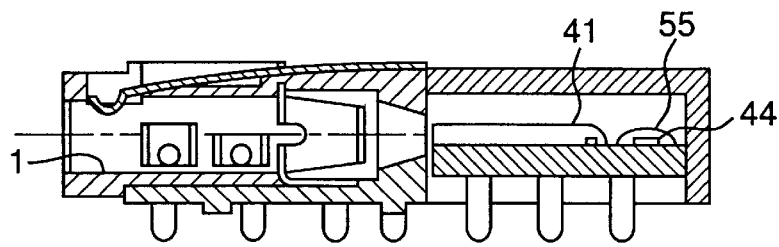

FIGS. 11A, 11B and 11C show different states of an optical transmit-receive module employing the construction of the third embodiment shown in FIGS. 4A and 4B. FIG. 11A shows a case where a miniature single-headed type electric plug is inserted in the connector section 1. FIG. 11B shows a case where an optical fiber plug is inserted in the connector section 1. FIG. 11C shows a case where nothing is inserted in the connector section 1.

Figure 12A:
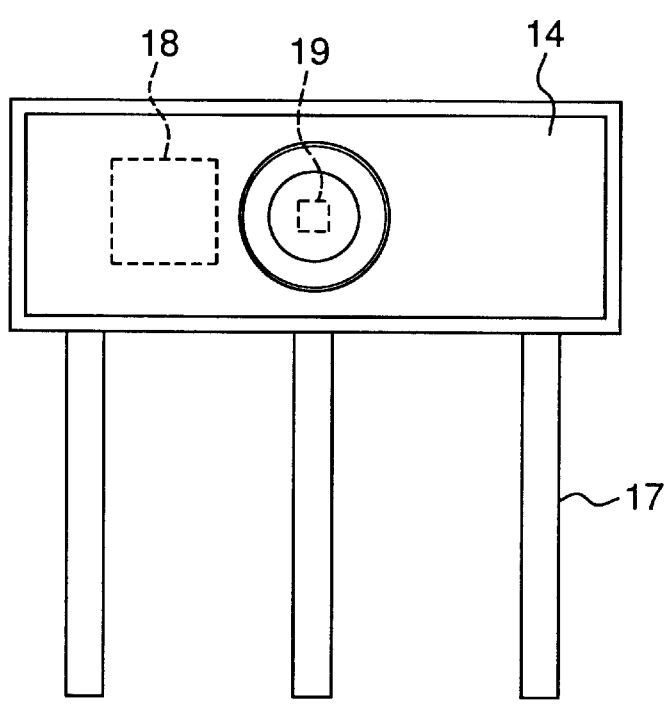
FIGS. 12A and 12B are front and side views, respectively, showing a mold-packaged light-emitting section for use in the optical transmit-receive module of the present invention.
Figure 12B:
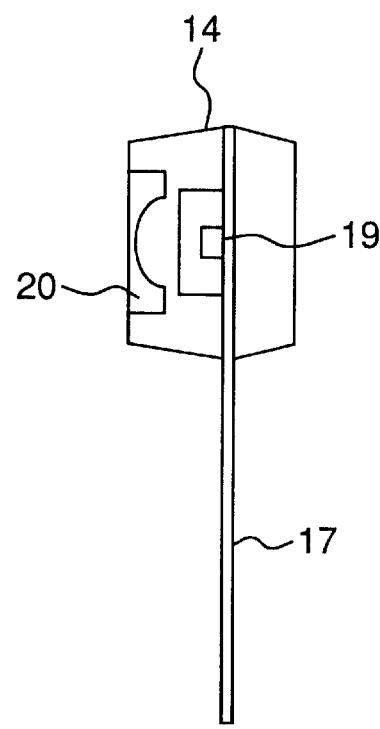

FIGS. 12A and 12B are front and side views, respectively, of the mold-packaged (unitized) light emitting section 14. In these figures are shown the lead frame 17, the driving integrated circuit chip 18, the semiconductor light-emitting device 19 and the condenser lens 20.

The mold-packaged light receiving section 15 can be formed by means of the same metal mold as that of the light emitting section 14. In this case, the light-receiving device 22 and the amplifying integrated circuit chip 23 are used in place of the semiconductor light-emitting device 19 and the driving integrated circuit chip 18, respectively.

Fourth Embodiment

An optical transmit-receive module according to a fourth embodiment of the present invention will be described with reference to FIGS. 13A and 13B. Components similar to the components of the preceding embodiments are denoted by the same reference numerals.

Figure 13A:
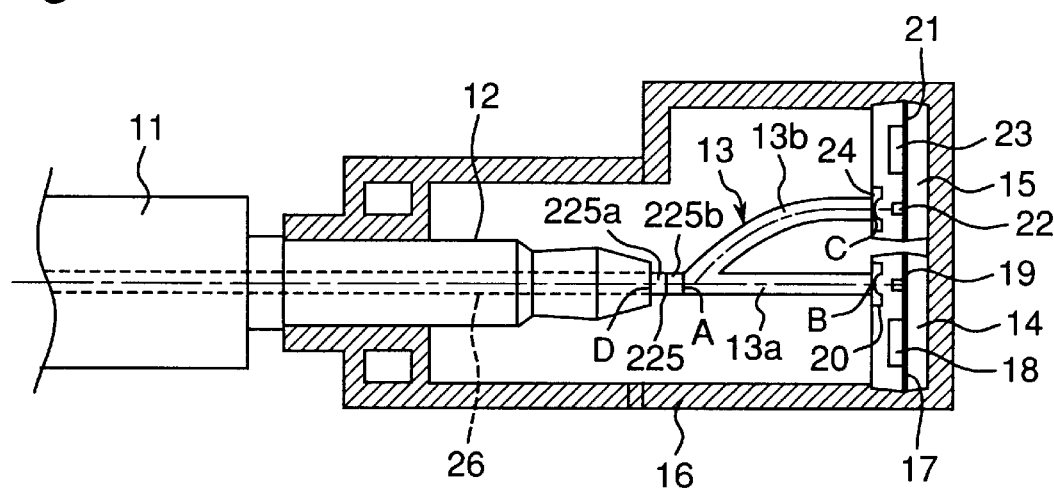
FIGS. 13A and 13B are sectional views showing the internal structure, as viewed from above, of an optical transmit-receive module according to a fourth embodiment, when an optical fiber plug and a light guide are in contact with each other and when they are not in contact with each other, respectively.
Figure 13B:
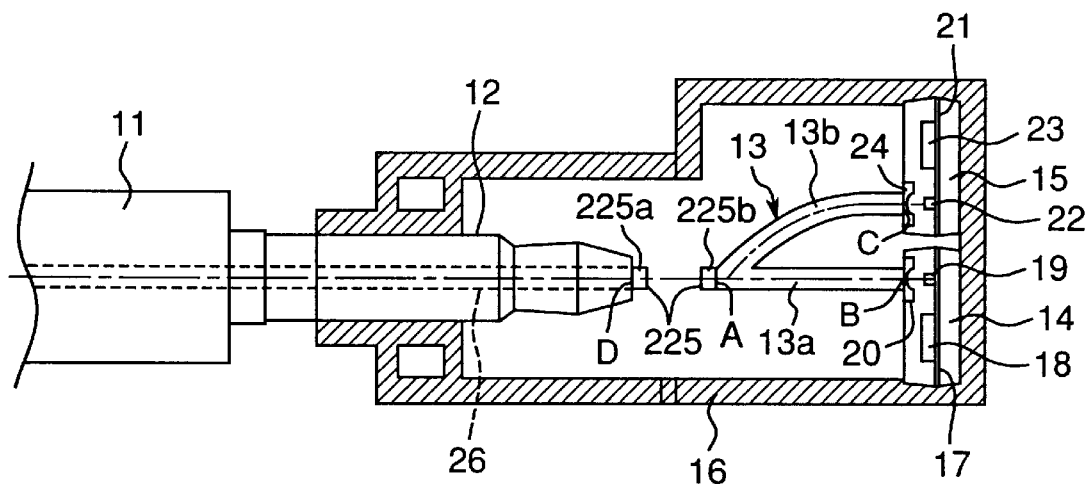

In FIG. 13A, the optical transmit-receive module has an optical fiber section 11, an optical fiber plug 12, a bifurcated type light guide 13 having branch sections 13a and 13b, a mold-packaged light-emitting section 14, a mold-packaged light-receiving section 15 and a housing 16 for housing the optical fiber plug 12, bifurcated type light guide 13, light-emitting section 14 and light-receiving section 15.

The mold-packaged light-emitting section 14 is provided with a semiconductor light-emitting device 19 and a driving integrated circuit chip 18 for processing a transmission signal and driving the semiconductor light-emitting device, both of which are mounted on a lead frame 17 having an input terminal, together with a condenser lens 20. On the other hand, the mold-packaged light-receiving section 15 is provided with a light-receiving device 22 for receiving a reception signal and converting the signal into an electrical signal and an amplifying integrated circuit chip 23 for processing the reception signal and outputting the resulting signal, both of which are mounted on a lead frame 21 having an output terminal, together with a condenser lens 24. Then, the optical transmit-receive module is roughly divided into two parts: a removable section including the optical fiber section 11 and the optical fiber plug 12 and a fixed section including the bifurcated type light guide 13, light-emitting section 14, light-receiving section 15 and housing 16.

An optical transmit-receive system employing this optical transmit-receive module is constructed so as to optically connect two optical transmit-receive modules via a single or a plurality of optical transmit-receive couplers by means of two optical fiber sections. This will be described later in connection with an eleventh embodiment shown in FIG. 23.

Operation in the transmission stage will be described. A transmission signal is inputted to the lead frame 17 having the input terminal, transmitted to the driving integrated circuit chip 18, converted into an electrical signal for driving the semiconductor light-emitting device, and applied to the semiconductor light-emitting device 19. The transmission signal converted into light by the semiconductor light-emitting device 19 is made incident on the end face B of one branch section 13a of the bifurcated type light guide 13 via the condenser lens 20, transmitted through the branch section 13a while being totally reflected by its inner surface, and then output from the end face A of the light guide 13 at the other end. The outgoing light is made incident on an optical fiber 26 provided in the optical fiber plug 12.

In this case, the end face C of the optical fiber 26 of the optical fiber plug 12 and the end face A of the bifurcated type light guide 13 are provided with light-permeable members 225a and 225b, respectively, which have a refractive index approximately equal to the refractive index of the optical fiber 26 or the light guide 13 and a hardness higher than hardnesses of these components.

The optical fiber 26 is integrated with the optical fiber section 11, and the optical transmission signal is transmitted through the optical fiber section 11 and guided to the bifurcated type light guide provided at one end.

Operation in the reception stage will be described next. The optical reception signal is transmitted through the optical fiber 26 of the optical fiber section 11, made incident on the end face A of the other branch section 13b of the bifurcated type light guide 13 from the light-permeable member 225a at the end face D of the optical fiber 26 of the optical fiber plug 12, transmitted through the branch section 13b and output from an end face C of the branch section 13b. The outgoing light is condensed by the condenser lens 24 of the light-receiving section 15, guided to the light-receiving device 22 and converted into an electrical reception signal. The converted electrical reception signal is processed by the amplifying integrated circuit chip 23 and outputted outwardly through the output terminal of the lead frame 21.

The feature of the present embodiment is that the end faces D and A of the optical fiber 26 of the optical fiber plug 12 and the bifurcated type light guide 13 are provided with the light-permeable members 225a and 225b, respectively, which have a refractive index approximately equal to the refractive index of the optical fiber 26 or the light guide 13 and a hardness higher than hardnesses of materials of these components.

It is easy to restrict the refractive index of the light-permeable members within a difference of ±0.1 with respect to the refractive index of the optical fiber or the light guide, and therefore, the total reflectance becomes about 0.1%, in this case. If, for example, a hard coating agent (for example, silicone-based KP-80 produced by Shin-Etsu Chemical Co., Ltd.) on the market is used for the light-permeable members 225 (225a and 225b), then the thickness of the resulting hard coating films is about several tens of micrometers or less. These hard coating films have an adhesive property and are therefore allowed to be easily fixed to the associated component parts by a coating process or the like. The coating film, therefore, requires neither vacuum drawing nor film thickness control, which would be required in forming an anti-reflection film and is able to be formed at a low cost.

In the case where the light-permeable member is made of the silicone-based KP-80, the material has a refractive index of 1.4 and a hardness of 6H (indicated by pencil hardness). This is formed by a dipping method, flow coating method, spraying method or the like. In contrast to this, if an acrylic material is selected for the optical fiber and the light guide, the material has a refractive index of 1.49 and a hardness of 2H (indicated by pencil hardness). Assuming that the refractive index of the light-permeable member and the refractive index of the optical fiber and the light guide are n2 and n1, respectively, then a vertical light reflectance $T_v$ is $T_v=(n1-n2)^2/(n1+n2)^2=(1.49-1.40)^2/(1.49+1.40)^2=0.00097$, i.e., 0.097%.

If a polycarbonate material is selected for the optical fiber and the light guide, the material has a hardness of B (indicated by pencil hardness), which is smaller than the hardness of the light-permeable member 225. Since the hardness of the light-permeable member is higher than the hardness of the optical fiber and the light guide, the light-permeable member hardly suffers scratches, so that the operating life can be prolonged.

Fifth Embodiment

Figure 14A:
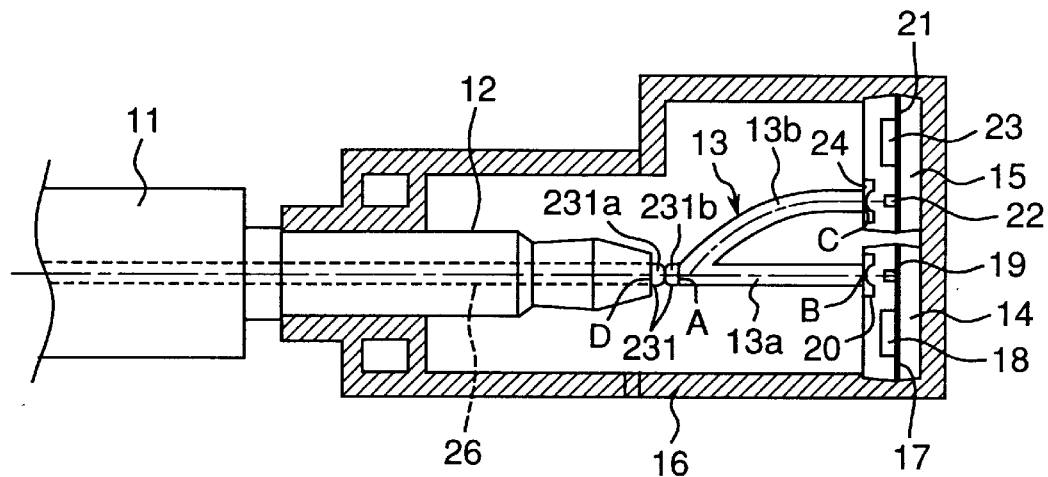
FIGS. 14A and 14B are sectional views showing the internal structure, as viewed from above, of an optical transmit-receive module according to a fifth embodiment, when an optical fiber plug and a light guide are in contact with each other and when they are not in contact with each other, respectively.
Figure 14B:
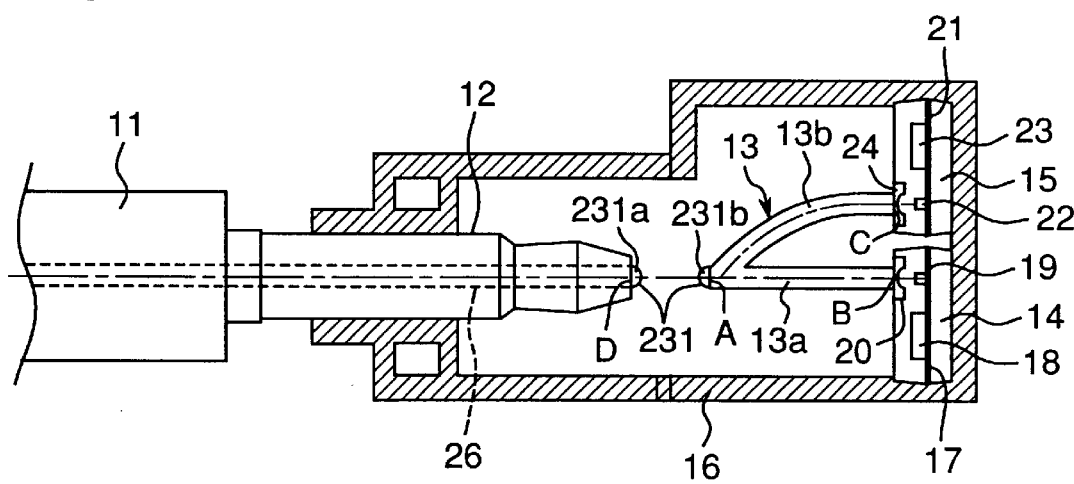

An optical transmit-receive module according to a fifth embodiment of the present invention will be described with reference to FIGS. 14A and 14B. In these figures, components similar to the components shown in FIGS. 13A and 13B are denoted by the same reference numerals, and no description is provided for them.

Only points different from the fourth embodiment will be described below with reference to FIGS. 14A and 14B. The feature of the fifth embodiment resides in that a light-permeable member 231 (231a and 231b) is formed of an elastic material. Therefore, if minute dust or dirt intrudes between the members 231, these members, which are made of the elastic material, easily deform to disperse the stress. Thus, the light-permeable members are hardly damaged. Furthermore, even if minute scratches or dents are generated in the light-permeable members to cause unevenness thereof, the unevenness is deformed by the mutual contact of these members, so that airspace disappears and reflection of light by the airspace is eliminated. By forming the front portions of the light-permeable members 231a and 231b into a convex shape, the contact starts from the center and expands toward the periphery during the contact deformation process. Consequently, involved air escapes toward the periphery during the deformation process. Therefore, even a minute airspace does not remain, resulting in an enhanced performance.

Operations in the transmission stage and the reception stage of the fifth embodiment are the same as the operations described in connection with the fourth embodiment.

As a concrete material for the light-permeable member 231, there can be enumerated silicone rubber, urethane rubber and the like. These materials have the following characteristics.

(Silicone Rubber)
    Refractive index: 1.4
    Hardness (JIS-A): 20–50
    Total surface reflectance relative to acrylic:
        0.097%
    Coating or providing method: dipping method,
        flow coating method,
        spraying method,
        or the like (Urethane Rubber)
    Refractive index: 1.5
    Hardness (JIS-A): 35–70
    Total surface reflectance relative to acrylic:
        0.001%
    Coating or providing method: dipping method,
        flow coating method,
        spraying method,
        or the like The silicone rubber and the urethane rubber, which have adhesive properties, can be directly fixed to the parts by coating or the like. The materials can also be bonded to the contact surface by a transparent adhesive having an approximately equal refractive index.

If an appropriate amount of light-permeable elastic material is attached to the associated part by the potting method or the like, then a convex shape is generated by the surface tension. Therefore, if the light-permeable elastic material is hardened in this state, the convex shape can be easily formed.

Sixth Embodiment

Figure 15A:
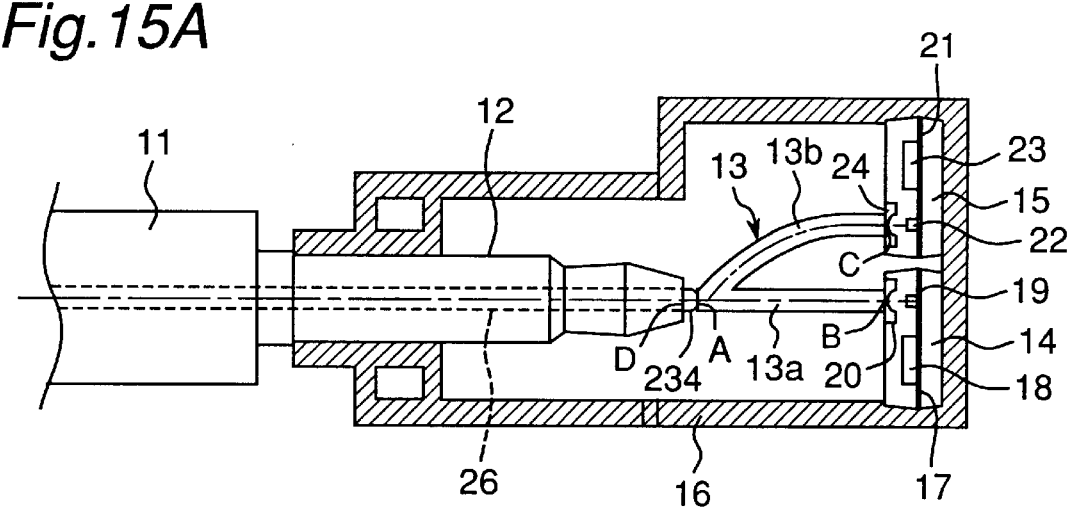
FIGS. 15A and 15B are sectional views showing the internal structure, as viewed from above, of an optical transmit-receive module according to a sixth embodiment, when an optical fiber plug and a light guide are in contact with each other and when they are not in contact with each other, respectively.
Figure 15B:
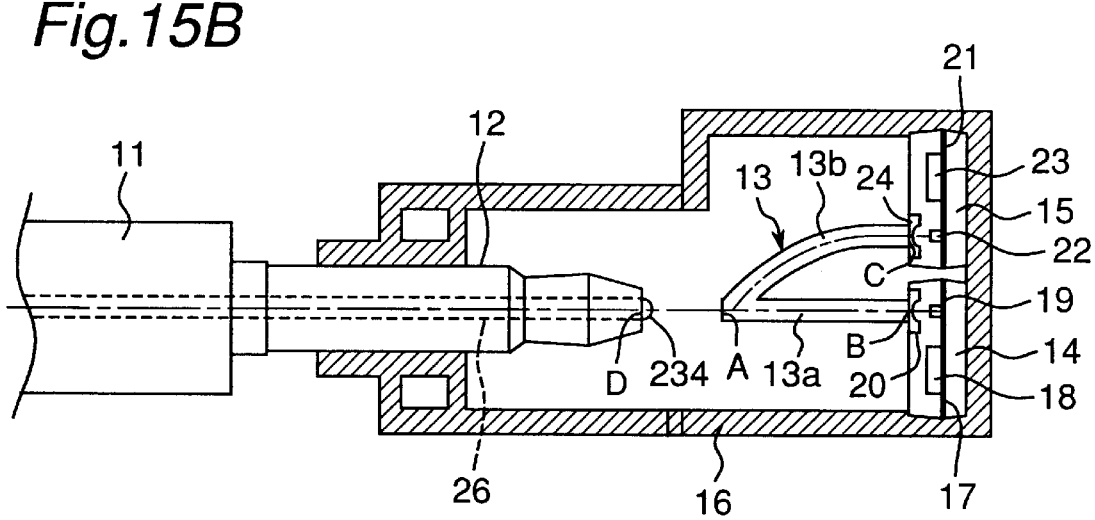

An optical transmit-receive module according to a sixth embodiment of the present invention will be described with reference to FIGS. 15A and 15B. In these figures, components similar to the components shown in FIGS. 13A through 14B are denoted by the same reference numerals, and no description is provided for them.

Only points different from the fourth embodiment and the fifth embodiment will be described below with reference to FIGS. 15A and 15B. The feature of the sixth embodiment resides in that a light-permeable member 34 is provided on only the end face D of the optical fiber 26 and formed of a gel material that is a light-permeable elastic material. The gel material is a material containing water or oil between its molecules. Therefore, even if there is a minute scratch, dust or dirt on the surface of the light-permeable member, the liquid contained in the gel material fills up the gap (airspace having a refractive index =1), and therefore, the reflection reduces. Dust or dirt tends to adhere to the gel material due to the surface tension of the liquid, and therefore, by fixing the gel material only on the optical fiber plug 12 side as illustrated, the dust or dirt adhering on the light guide 13 moves toward the optical fiber plug 12 side, and this allows the user to easily perform cleaning.

There are silicone gel, polyethylene gel or the like as the gel material that is a light-permeable elastic material. The materials, which have adhesive properties, can be easily fixed to the associated part by a coating process or the like.

Polyethylene gel and silicone gel have the following characteristics.

(Polyethylene Gel)
    Refractive index: 1.51
    Hardness (JIS-A): 1–12
    Total surface reflectance relative to acrylic:
        0.0044%
    Coating or providing method: brushing method,
        spraying method,
        dipping method,
        or the like (Silicone Gel)
    Refractive index: 1.4
    Hardness (JIS-A): 1–20
    Total surface reflectance relative to acrylic:
        0.097%
    Coating or providing method: brushing method,
        spraying method,
        dipping method,
        or the like A molded light-permeable member of the gel material can be bonded to the contact surface of the optical fiber by means of a transparent adhesive having an approximately equal refractive index.

Seventh Embodiment

Figure 16:
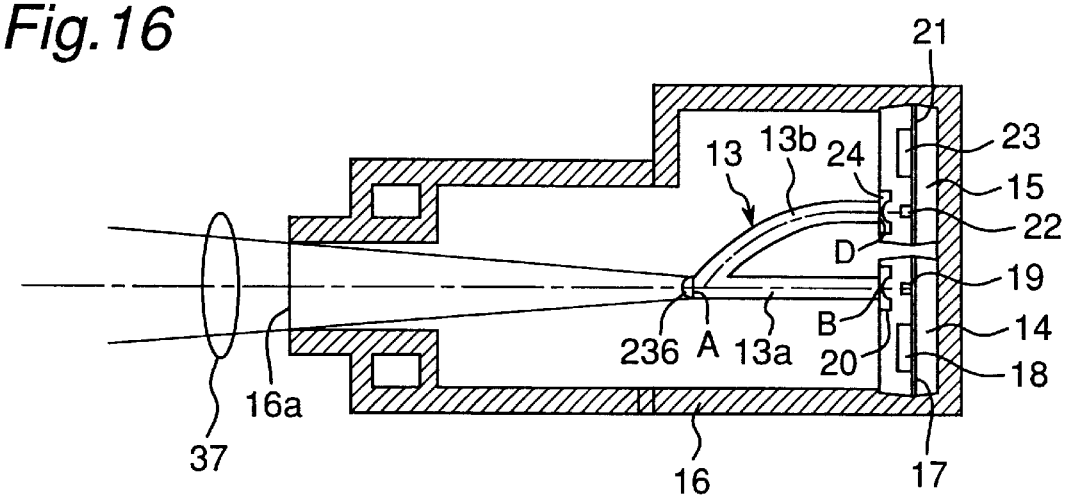
FIG. 16 is a sectional view showing the internal structure, as viewed from above, of an optical transmit-receive module according to a seventh embodiment, when no optical fiber plug is inserted.

An optical transmit-receive module according to a seventh embodiment of the present invention will be described with reference to FIG. 16. In FIG. 16, components similar to the components shown in FIGS. 13A through 15B are denoted by the same reference numerals, and no description is provided for them.

Only points different from the fourth through seventh embodiments will be described below. This optical transmit-receive module is characterized in that a light-permeable member 236 is constructed of a lens made of a light-permeable elastic material in order to allow optical space transmission to be achieved.

In general, an optical lens must be formed strictly into an optically designed curved shape, and not a mere convex shape. For this reason, the lens is formed by injection molding using a metal mold. The molded component having a lens shape is fixed to the end face A of the light guide 13 by means of a transparent adhesive having a refractive index approximately equal to the refractive index of the light guide 13.

The light guide 13 may be formed by the injection molding method of a light-permeable elastic material as modification of the embodiment of the present invention. The signal light emitted from the light-permeable member 236 at the end face A of the light guide is converged by the lens shape at the tip portion and transmitted outwardly of the module through an optical fiber plug entrance 16a of the optical transmit-receive module. On the other hand, incoming light enters the light guide 13 via the reverse path. Reference numeral 37 denotes incoming and outgoing light flux.

As an example of the light-permeable elastic material for the light-permeable member 236, there is silicone rubber. The properties of silicone rubber, such as a refractive index, rubber hardness (JIS-A), coating or providing method, total surface reflectance relative to acrylic, are as described in connection with the second embodiment.

The light-permeable member 236 is made of an elastic material. Therefore, even if minute particles of dust or dirt intrude between the optical fiber 26 and the light guide 13 when some optical fiber plug is inserted, the member 236 deforms to disperse the stress. Thus, the member 236 hardly suffers a scratch. Furthermore, even if a minute scratch is generated to cause unevenness to the surface of the member, the unevenness is deformed by the contact with the counterpart, so that an airspace disappears, and reflection by the airspace is eliminated.

Since the light-permeable member 236 is formed into a convex lens shape, if the optical fiber plug is inserted, then the contact starts from the center and the contact portion expands toward the periphery, and the involved air escapes toward the periphery during the deformation process. Therefore, no airspace remains.

If the plug is inserted, the lens formed of the light-permeable elastic material comes to have a planar surface and exerts no influence on the optical coupling with the optical fiber. The lens recovers its original lens shape if the plug is removed, so that the light going out of the light guide can be formed into parallel light or divergent light.

Eighth Embodiment

Figure 17A:
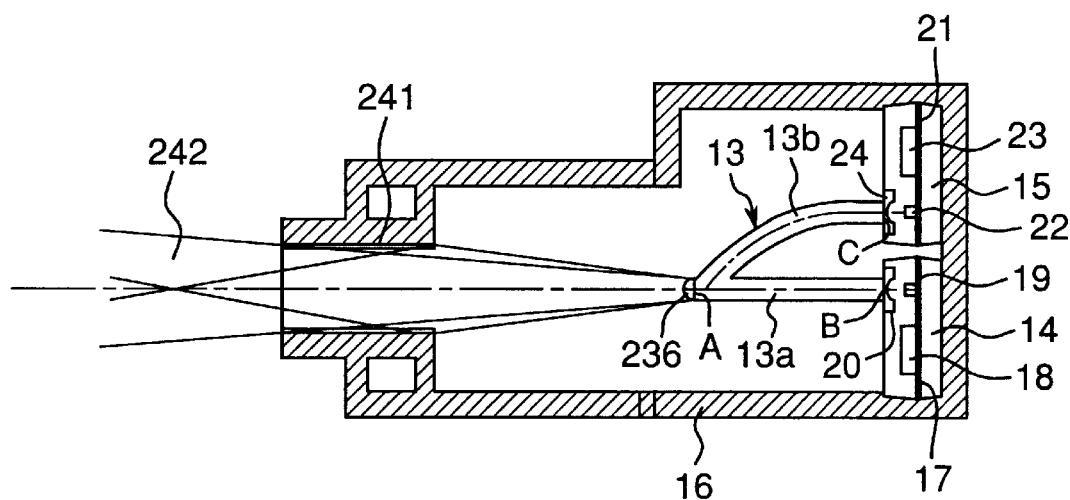
FIGS. 17A and 17B are sectional views, respectively, showing the internal structure, as viewed from above and from a lateral side, respectively, of an optical transmit-receive module according to an eighth embodiment, when no optical fiber plug is inserted.
Figure 17B:
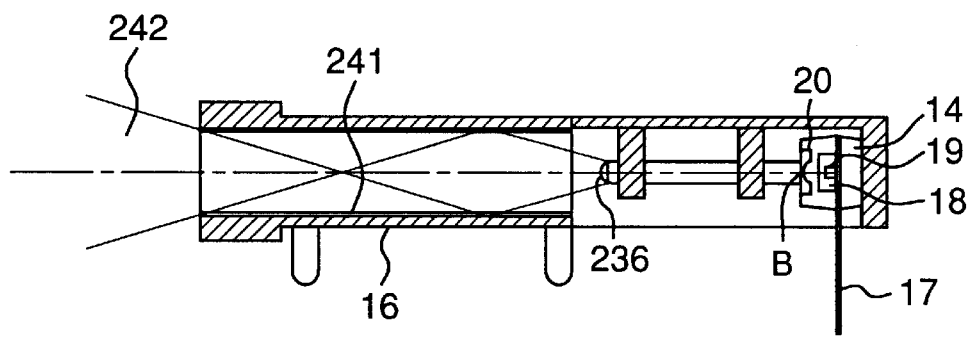

An optical transmit-receive module according to an eighth embodiment of the present invention will be described with reference to FIGS. 17A and 17B. In these figures, components similar to the components shown in FIG. 16 are denoted by the same reference numerals, and no description is provided for them.

The present embodiment differs from the seventh embodiment in that a reflecting film 241 is provided on the inner surface of the housing 16. After the formation of the housing 16 by the injection molding or the like, the reflecting film 241 is formed on the inner surface of the housing by plating or the like. As shown in FIGS. 17A and 17B, signal light propagates while repeating reflection by the inner surface of the housing 16, and this enables transmission and reception of a wider light flux. Reference numeral 242 denotes an incoming and outgoing flux of light.

Ninth Embodiment

Figure 18A:
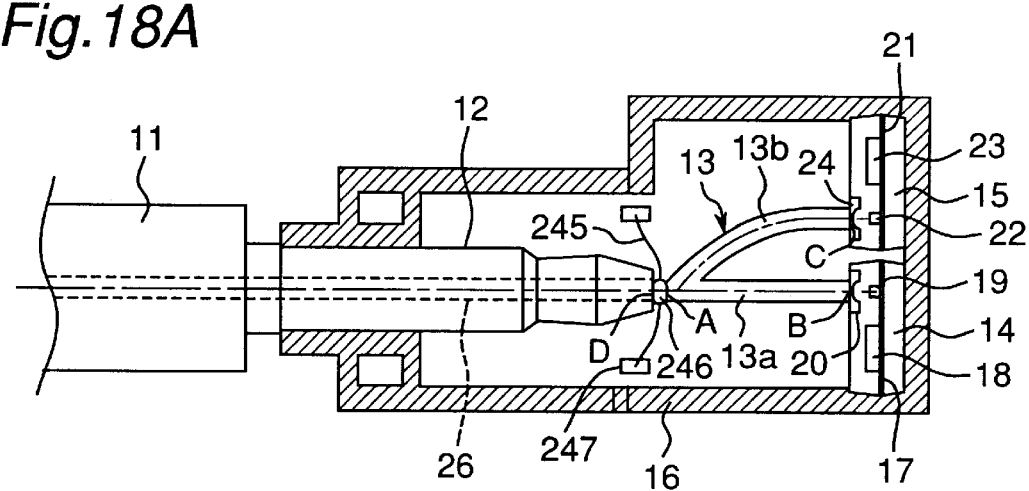
FIGS. 18A and 18B are sectional views showing the internal structure, as viewed from above, of an optical transmit-receive module according to a ninth embodiment, when an optical fiber plug and a light guide are put in contact with each other and when the optical fiber plug is pulled out, respectively.
Figure 18B:
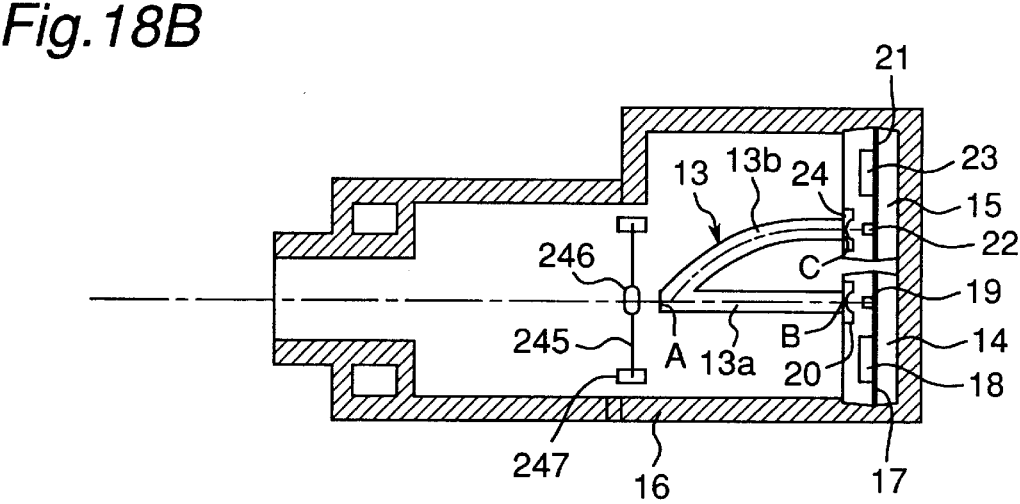

An optical transmit-receive module according to a ninth embodiment of the present invention will be described with reference to FIGS. 18A and 18B. The embodiment of the present invention is characterized in that a light-permeable member 246 made of a light-permeable elastic material is provided on a diaphragm 245. Only points different from the seventh embodiment will be described below.

In order to enable the optical space transmission as well, the light-permeable member 246 of this optical transmit-receive module has a lens shape. The light-permeable member 246 having this lens shape is formed by insert molding or the like on the diaphragm 245 formed of a thin plate of stainless steel or phosphor bronze. Reference numeral 247 denotes a frame for fitting and fixing the diaphragm 245 in the housing 16.

If the optical fiber plug 12 with no light-permeable member at its tip is inserted, then the light-permeable member 246 having a lens shape is pressed by the plug to deform the diaphragm 245. Consequently, the light-permeable member 246 moves to the end face A side of the light guide 13. The light-permeable member 246 (lens shape) soon comes in contact with the end face A of the light guide 13, so that the optical fiber 26 and the light guide 13 are optically connected to each other without any gap (without interposition of an airspace). If the optical fiber plug 12 is removed, then the light-permeable member 246 separates from the tip portion A of the light guide 13 due to a restoring force of the diaphragm 245 and returns to its original position. At this point of time, an airspace is formed on both sides of the light-permeable member 246 having the lens shape, and therefore, the lens functions as a double-sided lens. Therefore, the optical lens performance in this embodiment can be made higher than that of the light-permeable member 236 of the single-sided lens shape described in connection with the seventh embodiment.

Furthermore, by providing a plurality of the lens/diaphragm sets, the degree of freedom of design is increased. It is, of course, acceptable to use a spiral spring or the like in place of the diaphragm.

Tenth Embodiment

Figure 19:
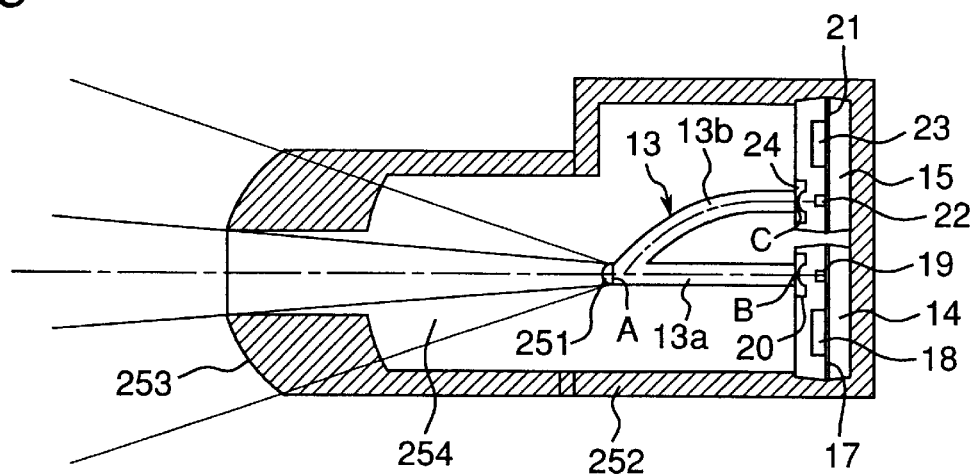
FIG. 19 is a sectional view showing the internal structure, as viewed from above, of an optical transmit-receive module according to a tenth embodiment, when no optical fiber plug is inserted.

An optical transmit-receive module according to a tenth embodiment of the present invention will be described with reference to FIG. 19. In this optical transmit-receive module too, a light-permeable member 251 is constructed of a lens of a light-permeable elastic material, similar to the seventh embodiment, in order to enable the optical space transmission as well.

This tenth embodiment differs from the seventh embodiment only in that a housing 252 is formed of a light-permeable material and a front 253 of the housing 252 around an aperture for insertion of the optical fiber plug 12 is formed into a lens shape. According to this tenth embodiment, the housing 252 allows the transmission and reception of light within a very wide range. Reference numeral 254 denotes an incoming and outgoing flux of light.

Eleventh Embodiment

An optical transmit-receive coupler according to an eleventh embodiment of the present invention will be described with reference to FIGS. 20A and 20B. The present embodiment is characterized in its excellent function of coupling an optical fiber plug 256 and an optical fiber plug 257. Only the characteristic point of the present embodiment will be described below.

Figure 20A:
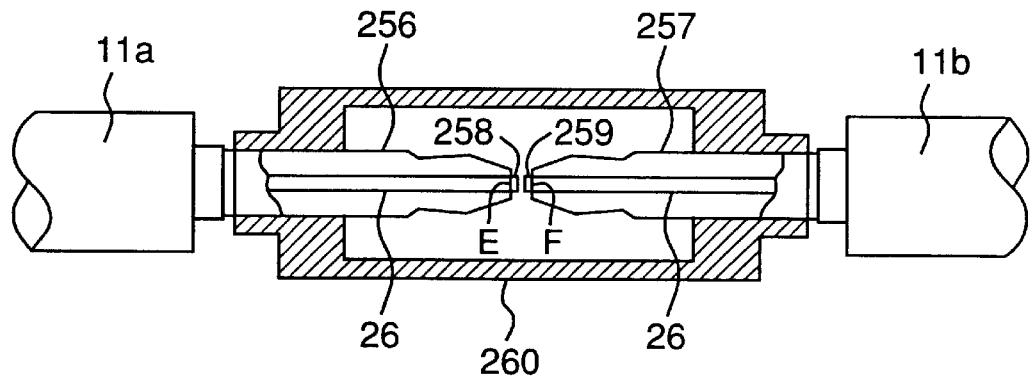
FIGS. 20A and 20B are sectional views showing the internal structure, as viewed from above, of an optical transmit-receive coupler according to an eleventh embodiment, in a state in which optical fiber plugs are inserted and not in contact with each other and a state in which the optical fiber plugs are inserted and put in contact with each other, respectively.

As shown in FIG. 20A, a tip E of the optical fiber plug 256 and a tip F of the optical fiber plug 257 are provided with light-permeable members 258 and 259, respectively, which have a refractive index approximately equal to the refractive index of the optical fiber 26 and a hardness higher than that of the optical fiber 26. Reference numerals 11*a* and 11*b* denote optical fiber sections, and reference numeral 260 denotes a housing.

Figure 20B:
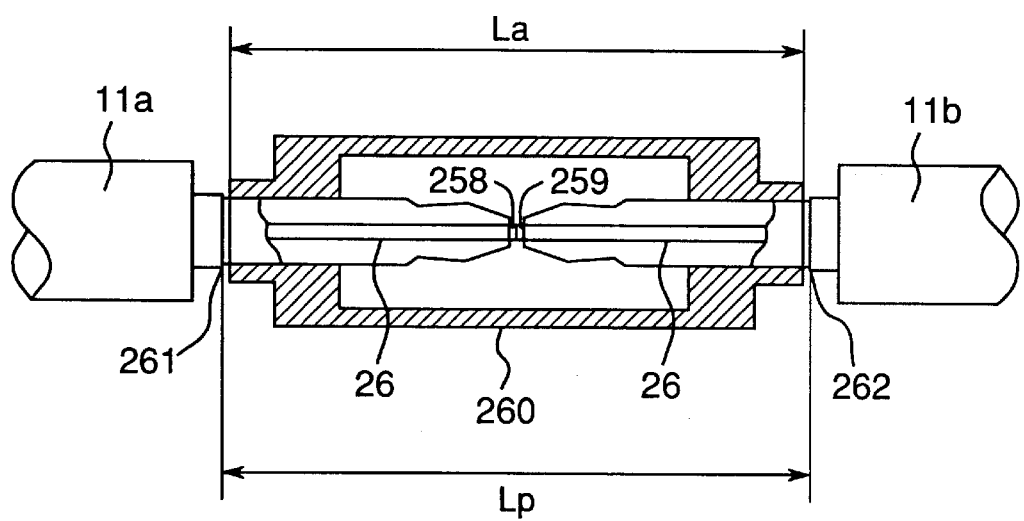

As shown in FIG. 20B, when the optical fiber plugs 256 and 257 are inserted in the housing 260, the optical fibers 26 extending through the plugs are optically connected to each other via the light-permeable members 258 and 259. It is easy to restrict the refractive index of the light-permeable members 258 and 259 within a difference of ±0.1 with respect to the refractive index of the optical fiber, and therefore, the total reflectance becomes about 0.1% in this case. For example, a commercially available hard coating agent (for example, KP-80 produced by Shin-Etsu Chemical Co., Ltd.) is used for the light-permeable members 258 and 259, and a coating thickness is about several tens of micrometers or less in this case. In the case of the silicone-resin-based KP-80, this material has a refractive index n=1.4 and a hardness of 6H (indicated by pencil hardness) and the members 258 and 259 are formed by the dipping method, flow coating method, spraying method or the like.

The hard coating films have adhesive properties and are therefore able to be easily fixed to the associated parts by the coating process or the like. Thus, the coating films necessitate neither vacuum drawing nor film thickness control, which would be required in forming an anti-reflection film, and is able to be formed at a low cost.

Assuming that a total length of the housing 260 is La, and that when the optical fiber plugs 256, 257 are placed in position in the housing 260, a length between a neck portion 261 of the optical fiber section 11a and a neck portion 262 of the optical fiber section 11b is Lp, as shown in FIG. 20B, the coupler is formed so as to satisfy the condition of La≦Lp, which is a condition of contact between the tips of the optical fiber plugs.

Twelfth Embodiment

Figure 21A:
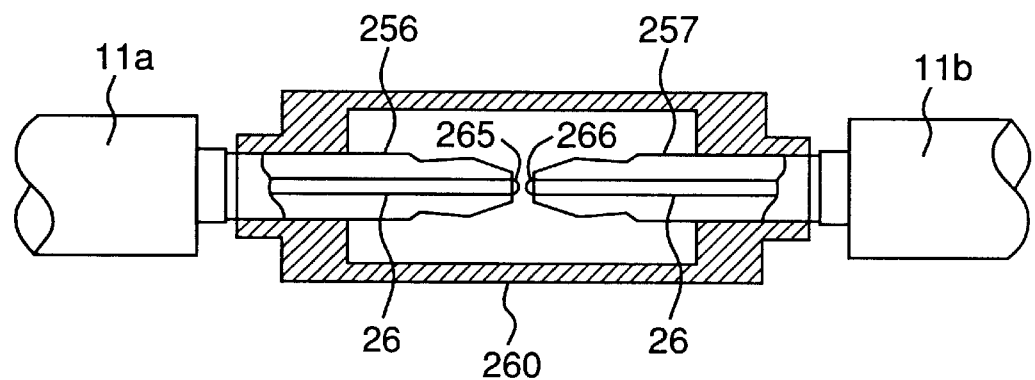
FIGS. 21A and 21B are sectional views showing the internal structure, as viewed from above, of an optical transmit-receive coupler according to a twelfth embodiment, in a state in which optical fiber plugs are inserted and not in contact with each other and a state in which the optical fiber plugs are inserted and put in contact with each other, respectively.
Figure 21B:
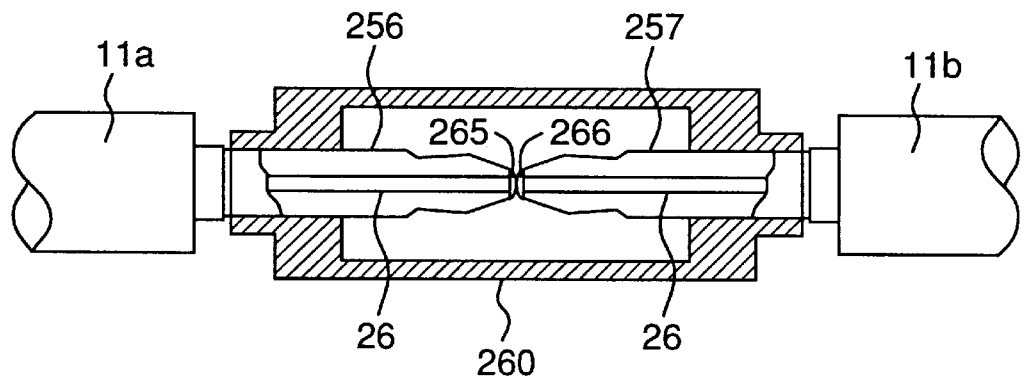

An optical transmit-receive coupler according to a twelfth embodiment of the present invention will be described with reference to FIGS. 21A and 21B.

The twelfth embodiment differs from the eleventh embodiment only in that light-permeable members 265 and 266 of the present embodiment are each constructed of a convex lens made of a light-permeable elastic material. In FIGS. 21A and 21B, components similar to the components shown in FIGS. 20A and 20B are denoted by the same reference numerals, and no description is provided for them.

With this arrangement, if minute particles of dust or dirt intrude between the light-permeable member 265 and the light-permeable member 266, then the members, which are made of the elastic material, are deformed in terms of volume to disperse the stress. Thus, these members hardly suffer a scratch. Even if minute scratches are generated to cause a surface unevenness, the unevenness is compensated by the direct contact of the light-permeable member 265 with the light-permeable member 266, so that the airspace disappears and the total reflectance decreases. By virtue of the convex shape, the contact between the light-permeable members starts from the center and the contact portion expands toward the periphery during the contact deformation process, and therefore, the involved air escapes toward the periphery during the deformation process. Therefore, the minute airspace does not remain, resulting in an enhanced optical transmission performance.

As the light-permeable elastic material, there are silicone rubber, urethane rubber, and the like, and these materials, which have adhesive properties, can be easily fixed to the associated part by a coating process or the like.

If an appropriate amount of light-permeable elastic material is placed on the associated part by the potting method or the like, then a convex shape is generated by the surface tension. Therefore, if the material is hardened in this state, the convex-shaped light-permeable member can be easily formed.

Thirteenth Embodiment

Figure 22A:
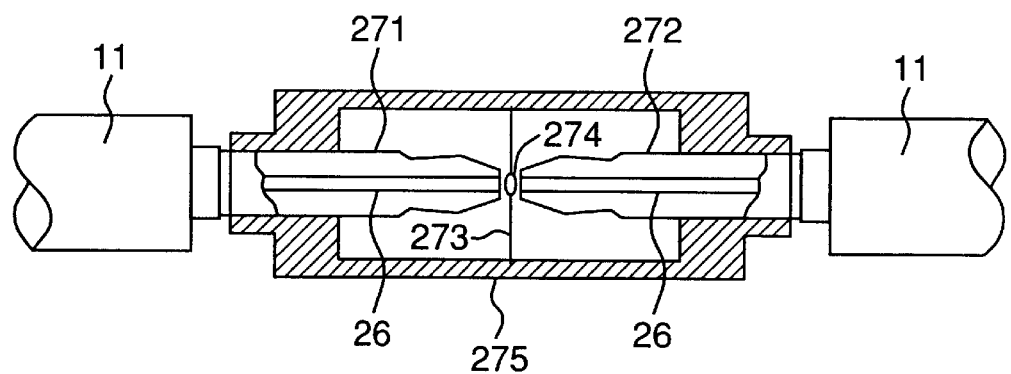
FIGS. 22A and 22B are sectional views showing the internal structure, as viewed from above, of an optical transmit-receive coupler according to a thirteenth embodiment, in a state in which optical fiber plugs are inserted and not in contact with each other and a state in which the optical fiber plugs are inserted and put in contact with each other, respectively.
Figure 22B:
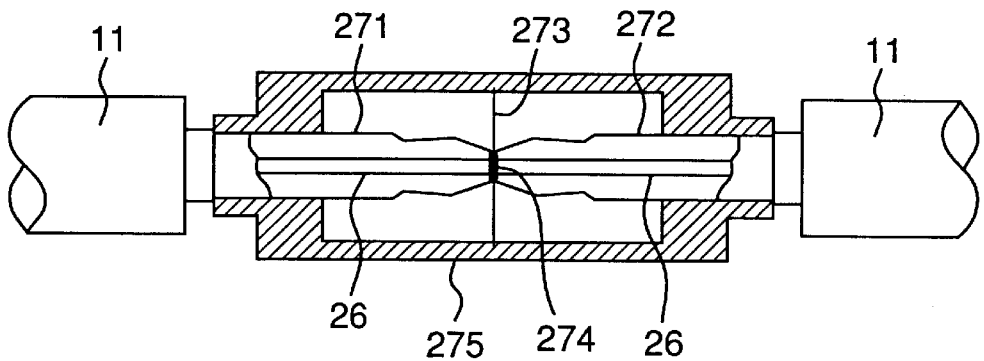

An optical transmit-receive coupler according to a thirteenth embodiment of the present invention will be described with reference to FIGS. 22A and 22B. The present embodiment differs from the twelfth embodiment only in that a light-permeable member 274 made of a light-permeable elastic material is provided on a diaphragm (support member) 273 fitted in a center portion of a housing 275 for optical connection between an optical fiber plug 271 and an optical fiber plug 272.

With this arrangement, even if existing prior-art the optical fiber plugs for the optical fiber cable are inserted in the housing, the tip of the optical fiber 26 inside one optical fiber plug is optically connected to the tip of the other optical fiber 26 via the light-permeable member 274 made of the light-permeable elastic material. Therefore, the total reflectance is suppressed. Also, end faces of the optical fibers 26 hardly suffer a scratch due to the elasticity of the member 274.

Fourteenth Embodiment

An optical transmit-receive system according to a fourteenth embodiment of the present invention will be described with reference to FIG. 23. The optical transmit-receive system is constructed by connecting two optical transmit-receive modules to each other by two or more optical fiber sections 11 via a single or a plurality of optical transmit-receive couplers.

FIG. 23 shows an example in which the optical transmit-receive modules 30a, 30b described in connection with the fifth embodiment are connected to each other via the already popularized optical fiber sections (optical fiber cables) 11 of the prior art technique and the optical transmit-receive coupler described in connection with the thirteenth embodiment so as to perform optical signal transmission (transmission and reception) by the full-duplex communications system.

In optically connecting an optical fiber plug 271 and an optical fiber plug 272 for the optical fiber sections (optical fiber cables) 11, the optical connection is performed via the light-permeable member 274 made of a light-permeable elastic material on the diaphragm 273 inside the housing 275 of the coupler 270. Therefore, no gap (airspace) is generated between the plugs 271 and 272, so that transmission light from, for example, the optical transmit-receive module 30a is prevented from being reflected by air back to the same module 30a into its own receiver.

Therefore, the optical transmit-receive system of the fourteenth embodiment is an optical transmit-receive system capable of efficiently performing transmission and reception by the full-duplex communications system.

Fifteenth Embodiment

An optical transmit-receive module according to a fifteenth embodiment of the present invention will be described with reference to FIGS. 24A and 24B.

The fifteenth embodiment differs from the fourth embodiment (FIGS. 13A, 13B) only in the light-permeable member provided between the end face of the optical fiber inserted through an optical fiber plug and the end face of the light guide. Therefore, in FIGS. 24A and 24B, components similar to the components of the fourth embodiment are denoted by the same reference numerals used in FIGS. 13A and 13B, and no description is provided for them.

A light-permeable member 283 in the fifteenth embodiment is provided with conductivity and constructed of a laminated structure of an insulating light-permeable material and a conductive light-permeable material, a mixture of a light-permeable material and a conductive material, or a light-permeable material provided with conductivity. The light-permeable member 283 is a light-permeable member that has a "refractive index approximately equal to" the refractive index of the light guide 13 and the optical fiber plug 12 for the optical fiber section 11 and is optically connected with the light guide 13 and the optical fiber plug 12 while being interposed therebetween.

The "approximately equal refractive index" means that a difference of the refractive index of the light-permeable member from the refractive index of the optical fiber and the light guide is restricted within ±0.1, as described in connection with the optical transmit-receive modules of the fourth embodiment and so on of the present invention. In this case, the total reflectance becomes about 0.1%. Specifically, a silicone-based material or the like is used for the light-permeable member 283.

Figure 24A:
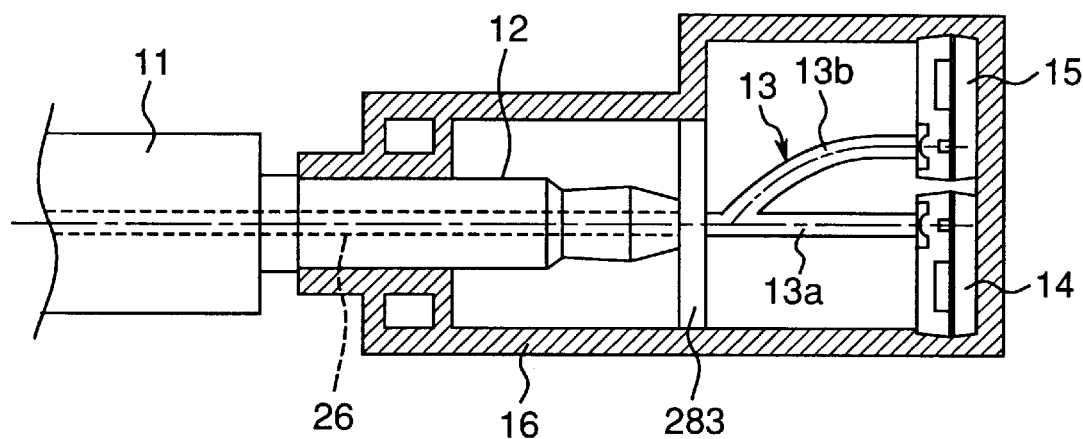
FIGS. 24A and 24B are sectional views showing the internal structure, as viewed from above and from a lateral side, respectively, of an optical transmit-receive module according to a fifteenth embodiment, when an optical fiber plug is inserted.
Figure 24B:
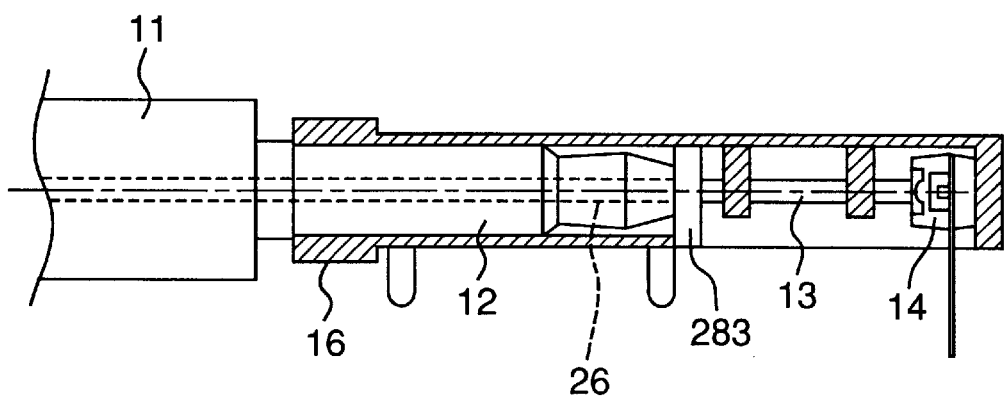

In FIGS. 24A and 24B, the components other than the light-permeable member 283 and the operations thereof have been described with reference to FIGS. 13A, 13B and so on, and no description is provided here for them.

Sixteenth Embodiment

Figure 25A:
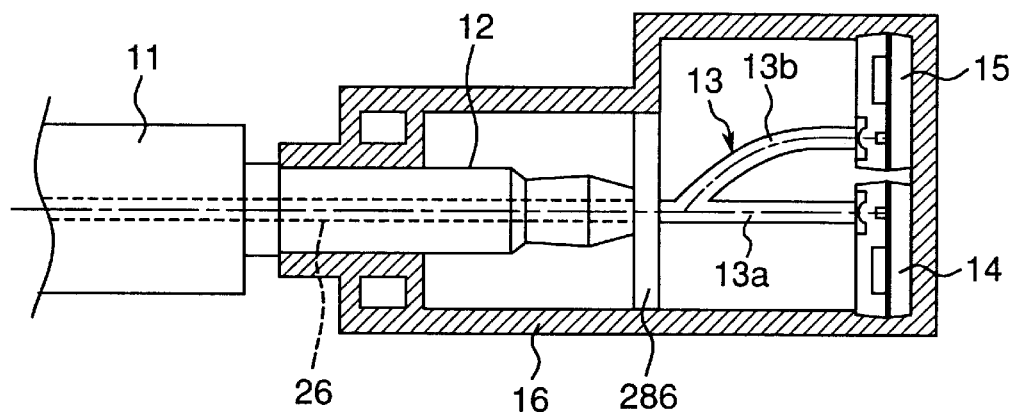
FIGS. 25A and 25B are sectional views showing the internal structure, as viewed from above and from a lateral side, respectively, of an optical transmit-receive module according to a sixteenth embodiment, when an optical fiber plug is inserted.
Figure 25B:
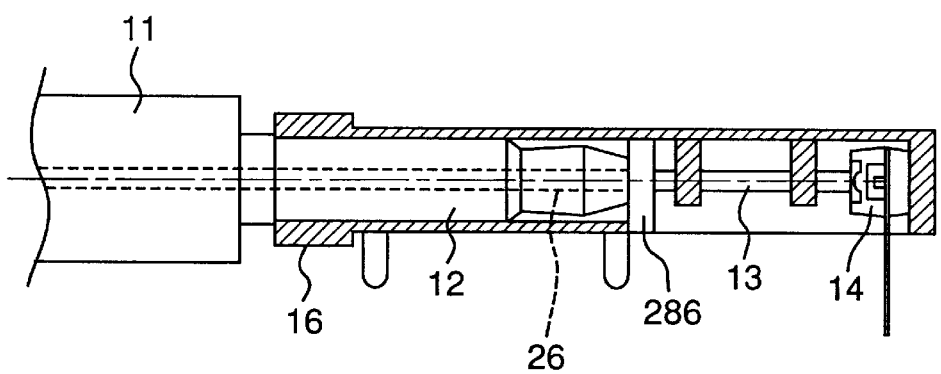

An optical transmit-receive module according to a sixteenth embodiment of the present invention will be described with reference to FIGS. 25A, 25B and 25C.

Figure 25C:
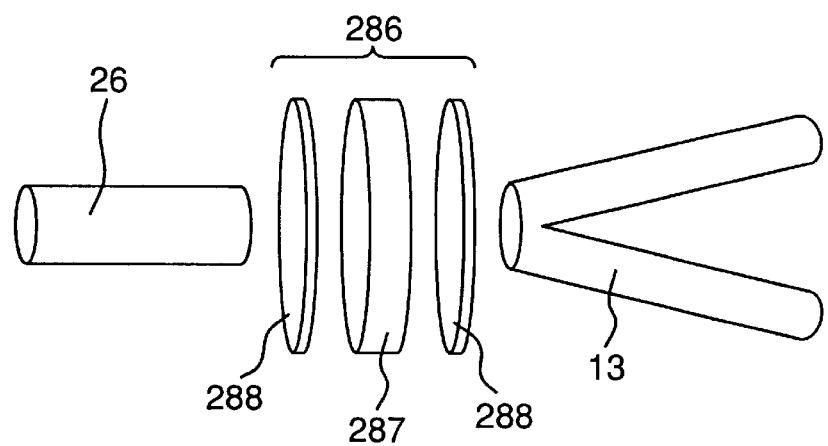
FIG. 25C is an explanatory view showing the construction of a light-permeable member used for the sixteenth embodiment.

As shown in FIG. 25C, a light-permeable member 286 in the sixteenth embodiment is constructed of a laminated structure obtained by providing a conductive material 288 on both surfaces of an insulating light-permeable material 287.

For the insulating light-permeable material 287, the same material as that of the light-permeable member 225 and the light-permeable member 231, which are already described above, can be used. On the other hand, the conductive material 288 is a light-permeable film provided with a thin film conductive film such as a conductive ITO (Indium Tin Oxide) film. As a base film for the thin film conductive film of the conductive material 288, PET (polyethylene terephthalate), PC (polycarbonate), PMMA (polymethyl methacrylate) or the like is used.

By grounding the light-permeable member 286 provided with the conductivity, static electricity generated in the contact portion when inserting and pulling out the optical fiber plug 12 can be escaped. Therefore, even if minute dust comes in contact with the conductive film during a number of inserting and pulling out operations, the dust, dirt or the like hardly adheres to the film, so that high optical characteristics can be maintained.

Furthermore, even if the optical fiber plug is inserted and pulled out many times, the optical fiber 26 of the optical fiber plug 12 always comes in contact with the bifurcated type light guide 13 via the light-permeable member 286, consequently causing no scratch on both. The conductive material 288 (film) is generally a hard material, which produces an additional effect of mechanically protecting the insulating light-permeable material 287 that is generally a soft material.

Seventeenth Embodiment

Figure 26A:
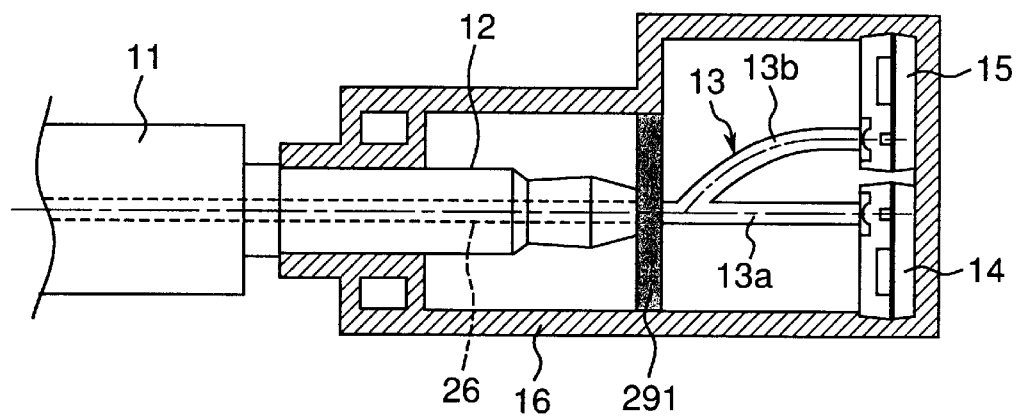
FIGS. 26A and 26B are sectional views showing the internal structure, as viewed from above and from a lateral side, respectively, of an optical transmit-receive module according to a seventeenth embodiment, when an optical fiber plug is inserted.
Figure 26B:
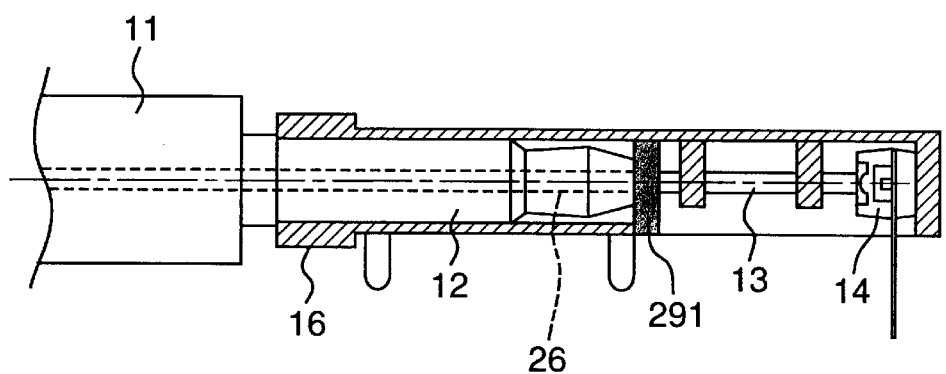
Figure 26C:
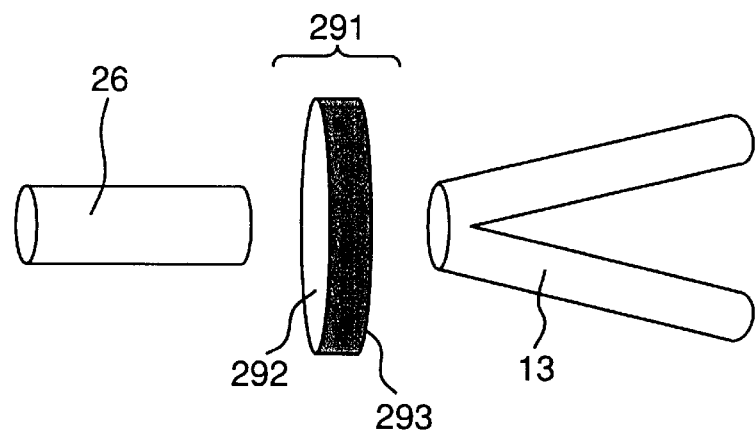
FIG. 26C is an explanatory view showing the construction of a light-permeable member used for the seventeenth embodiment.

An optical transmit-receive module according to a seventeenth embodiment of the present invention will be described with reference to FIGS. 26A, 26B and 26C. The seventeenth embodiment differs from the sixteenth embodiment only in the construction of the light-permeable member.

A light-permeable member 291 has a structure in which a light-absorbing film (a material having a high optical absorption coefficient) 293 is provided around a light-permeable piece 292. As a concrete example of a material of the light-absorbing film 293, there can be enumerated an appropriate amount of carbon dissolved in an organic resin for use in paint (for example, SH804 of Toray Dow Corning Silicone Inc.) exhibiting firm adhesion to the light-permeable member 292, a black resin (for example, a potting agent CY52-211 of Toray Dow Corning Silicone Co., Ltd.) exhibiting firm adhesion to the light-permeable member 292, and the like, and the light-absorbing film is formed by the coating, potting or the like of either of these materials.

The light-permeable member 291 having the light-absorbing film 293 around the light-permeable piece 292 can reduce reflected return light for the reason that, if a reflection light occurs in the light-permeable piece 292, then the light impinging on its outer periphery are almost entirely absorbed by the light-absorbing material 293, so that the signal-to-noise ratio can be improved.

An optical simulation was performed with the light-absorbing material 293 put in a non-reflection state according to the optical transmit-receive module of the seventeenth embodiment of the present invention. As a result, it was found that the reflected return light could be reduced by about 0.15% as compared with the case where simple Fresnel reflection occurs.

Eighteenth Embodiment

An optical transmit-receive module according to an eighteenth embodiment of the present invention will be described with reference to FIGS. 27A and 27B.

Figure 27A:
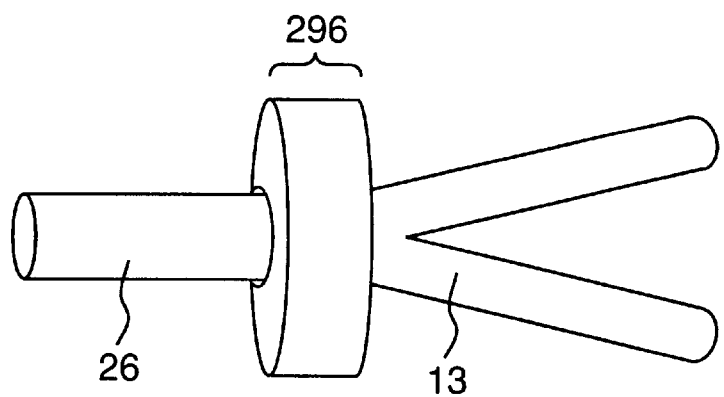
FIG. 27A is an explanatory view showing a state in which an optical fiber plug and a light-permeable member abut against each other and a state in which a bifurcated type light guide and the light-permeable member abut against each other in an optical transmit-receive module according to an eighteenth embodiment.
Figure 27B:
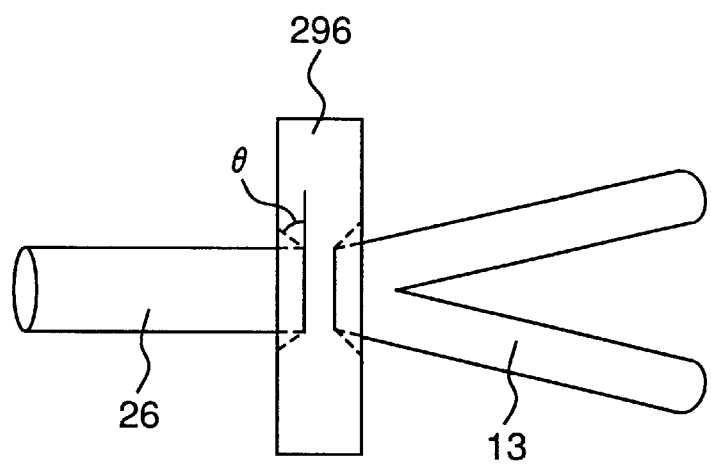
FIG. 27B shows a taper angle formed on the light-permeable member of the eighteenth embodiment.

In FIGS. 27A and 27B, a taper angle θ is formed on opposed abutment portions of a light-permeable member 296 against which the optical fiber 26 of the optical fiber plug and the bifurcated type light guide 13 abut, respectively. By providing such a tapered shape of a taper angle θ or a truncated conical shape on the abutment surfaces of the light-permeable member 296, the Fresnel reflection occurring on the abutment surfaces of the light-permeable member 296 can be spuriously put into a state close to the non-reflection state, so that light components which would be the return light in the prior art example can be prevented from directly returning toward the optical fiber 26.

Figure 29A:
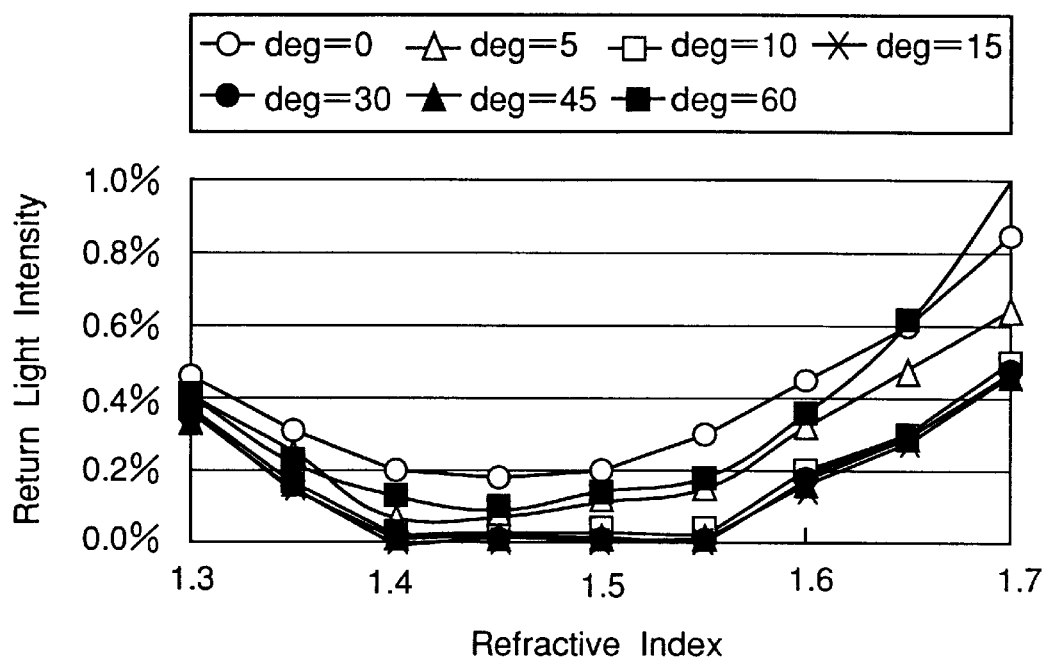
FIGS. 29A and 29B are graphs for explaining a relationship between a refractive index, a taper angle $\theta$ and a return light intensity of the light-permeable member of the eighteenth embodiment and a relationship between the taper angle $\theta$ and the return light intensity in connection with the light-permeable member having a refractive index of 1.5, respectively.
Figure 29B:
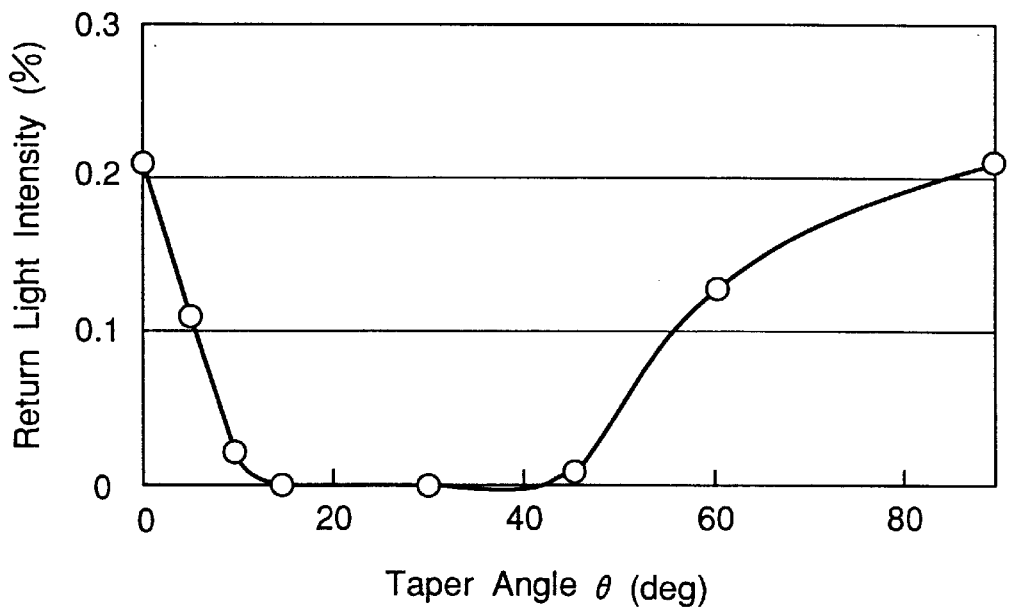
Figure 30:
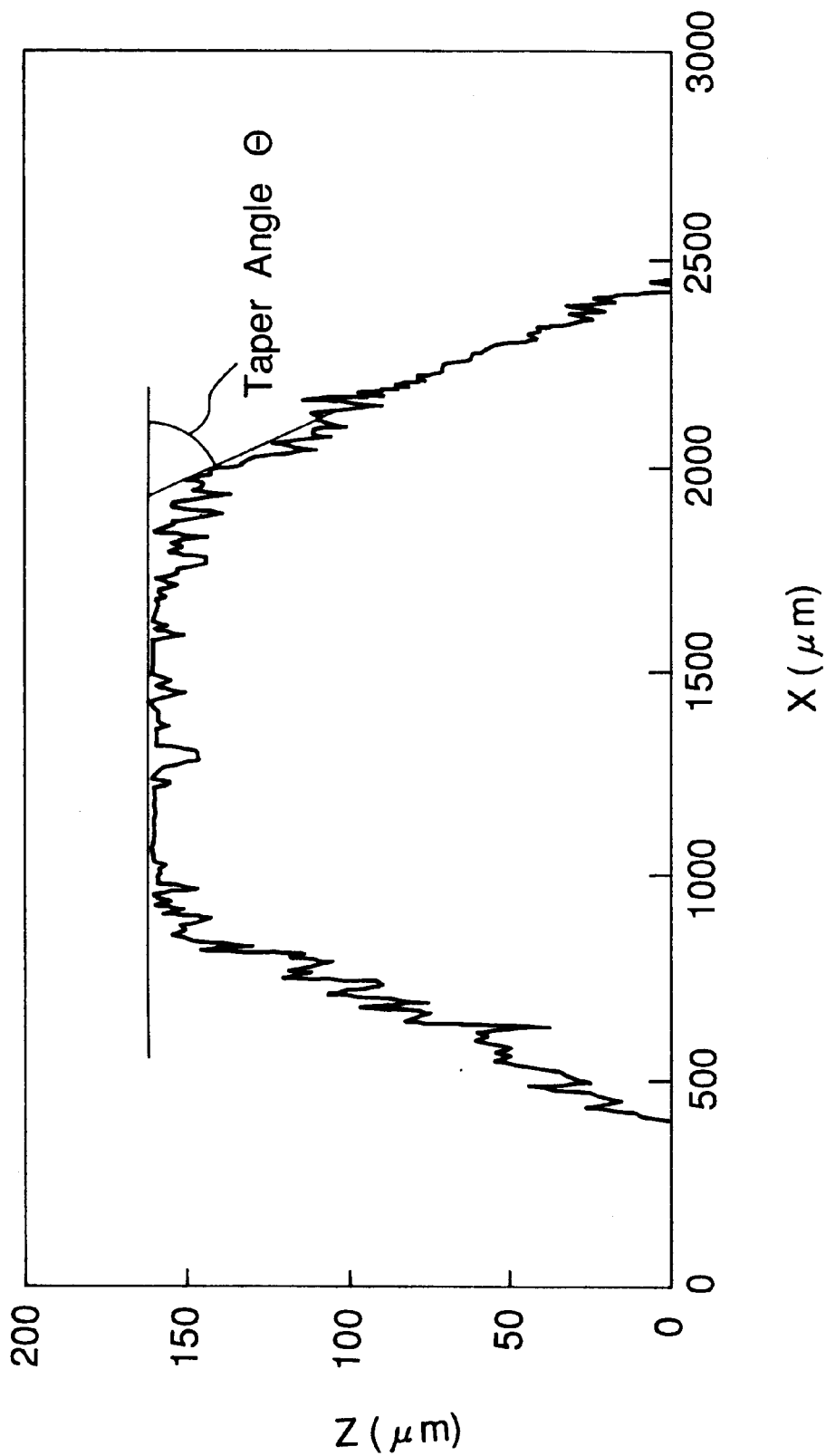
FIG. 30 is a graph for explaining a relationship between a distance X ($\mu$m) in the radial direction of the optical fiber and a depth Z (μm) of an abutment surface of the connector in the eighteenth embodiment.
Figure 31A:
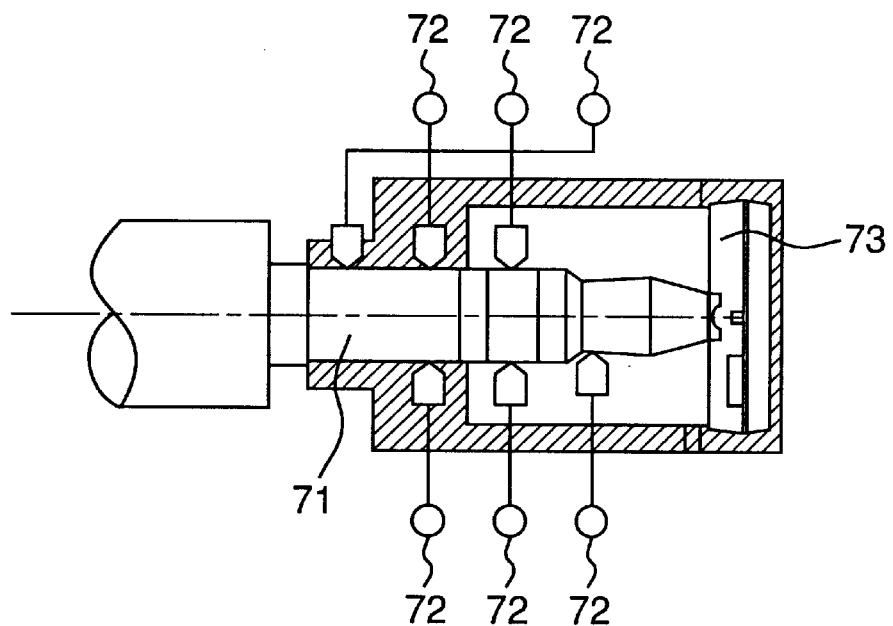
FIGS. 31A and 31B show a prior art optical transmit-receive module in a state in which a miniature single-headed type electric plug is inserted in the connector section and in a state in which an optical fiber plug is inserted in the connector section, respectively.
Figure 31B:
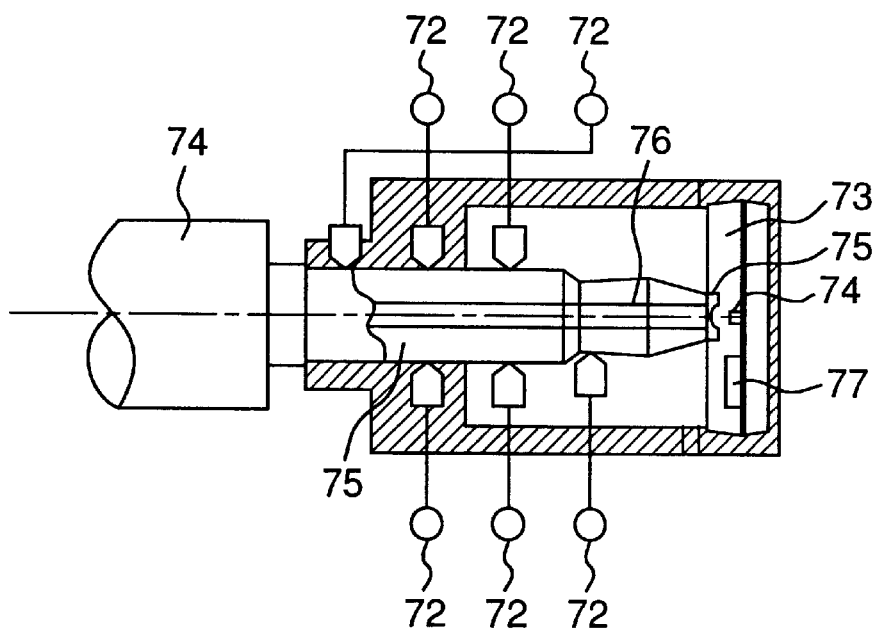
Figures 32, 33, 34:
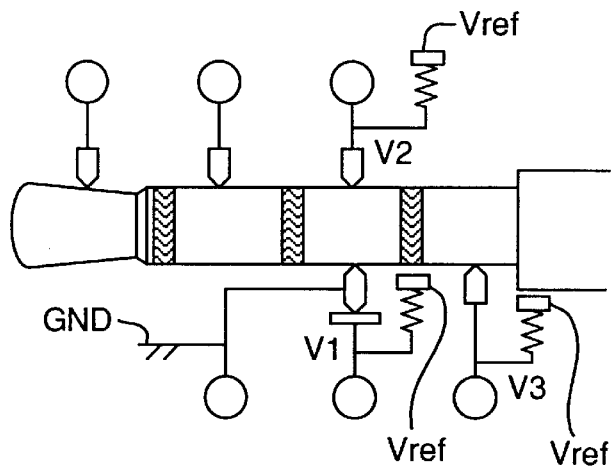
FIG. 32 is an illustration for explaining a state in which three identification terminals are brought in contact with a plug.
FIG. 33 is a diagram showing relations between the input sides and the output sides of different plugs.
FIG. 34 is a table showing correspondence between the types of the plugs and the outputs of the identification terminals.
Figure 35:
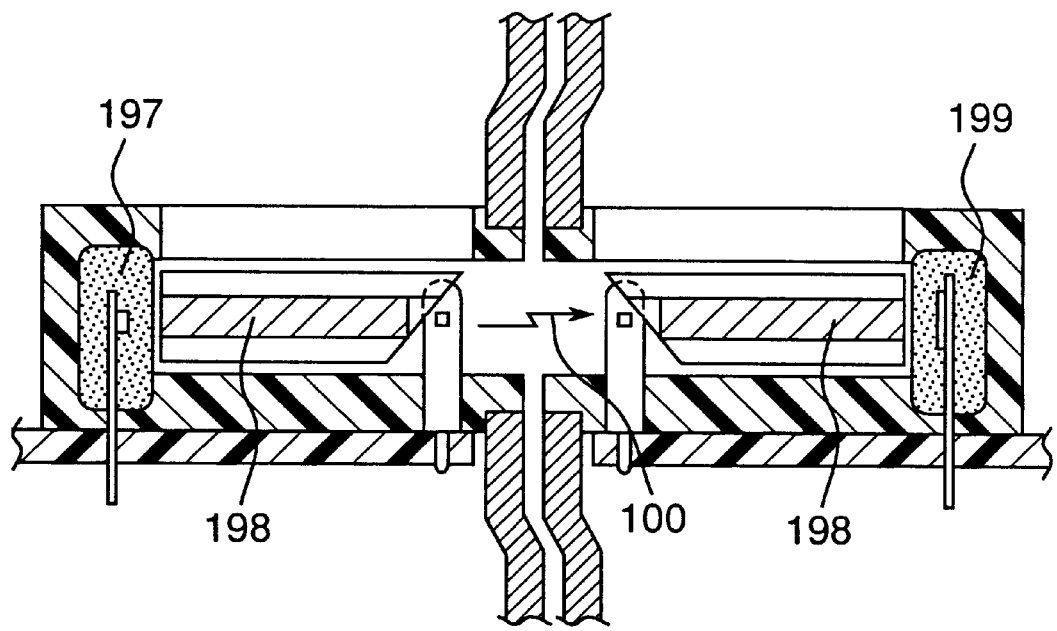
FIG. 35 is a sectional view for explaining a prior art optical transmit-receive module for performing both fiber transmission and optical space transmission.

FIGS. 29A, 29B and 30 show optical simulation results about the optical transmit-receive module of the eighteenth embodiment of the present invention.

In FIG. 29A, the refractive index of the light permeable member 296 is plotted along the horizontal axis, the taper angle θ is used as a parameter and the return light intensity is plotted along the vertical axis. In FIG. 29A, if the taper angle θ is set to 0 degrees, five degrees, 10 degrees, 15 degrees, 30 degrees, 45 degrees and 60 degrees, then the return light intensity monotonously reduces from 0.4% to 0.01%, or below as the refractive index increases from 1.3 to 1.4. In a region where the refractive index is 1.4 to 1.55, the return light intensity shifts almost flatly with a value of about 0% to 0.2%. In a region where the refractive index is above 1.55, the return light intensity monotonously increases.

In FIG. 29B, the refractive index of the transmitting member 296 is set to 1.5 as a parameter, the taper angle θ is plotted along the horizontal axis and the return light intensity is plotted along the vertical axis. In this case, it is indicated that the return light intensity becomes almost 0% within a range of 15 degrees to 45 degrees of the taper angle θ.

In order to achieve a state in which the return light intensity is almost 0% as shown in FIG. 29B, it is required to appropriately set the depth of abutment of the connector (plug) and the hardness of the light-permeable member. As a concrete example of a material for the light-permeable member 296, there is a urethane-based material (produced by Tigers Polymer Corp., urethane being not yellowed, refractive index n=1.513).

FIG. 30 is an example of measurement of the taper angle θ, showing data of the urethane-based material (produced by Tigers Polymer Corp., urethane being not yellowed) used for the light-permeable member 296. In FIG. 30, a distance X (μm) from a reference position in the radial direction of the optical fiber is plotted along the horizontal axis, an abutment depth Z (μm) in which the connector (plug) abuts against the light-permeable member is plotted along the vertical axis. When the distance X is about 400 to 900 μm and when it is about 1900 to 2400 μm, the abutment depth Z increases from about 0 μm to 160 μm, and the inclination of this increase is the taper angle θ. It is often the case where the taper angle θ takes approximately equal values on the left-hand side and the right-hand side although it depends on the state of abutment. When the distance X is about 900 to 1900 μm, the abutment depth Z becomes almost constant at about 160 μm. A value of [about 1900 μm—about 900 μm=about 1000 μm (about 1 mm)] corresponds to a value of the diameter of the optical fiber. The taper angle θ formed outside the diameter of about 1000 μm of the optical fiber does not change partway, exhibiting an approximately uniform angle of about 20 degrees.

The material of this light-permeable member 296 has a hardness equivalent to that of a common desk mat. In order to achieve the taper angle θ of 20 to 40 degrees, it is necessary to select a material that has a relatively high hardness as compared with a silicone gel or other soft materials.

The abutment depth, which is the other factor determining the taper angle, can also be adjusted by adjusting the position of a connector-fixing jig inside the housing.

Nineteenth Embodiment

An optical transmit-receive module according to a nineteenth embodiment of the present invention will be described with reference to FIG. 28.

Figure 28:
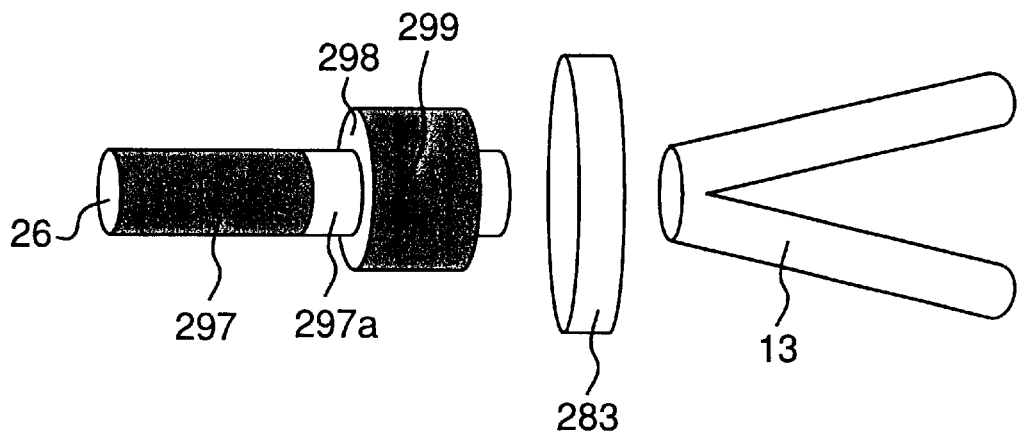
FIG. 28 is a view of the essential parts of an optical transmit-receive module according to a nineteenth embodiment, for explaining a structure for removing a reflected return light that is transmitted with a diameter larger than a numerical aperture (NA), in a portion near an output end of the optical fiber.

In FIG. 28, a sheath or covering 297 of the optical fiber 26, which is an inner core of the optical fiber plug, is removed in an end portion located as close to an output end of the optical fiber as possible. Then, a refractive index matching member 298 having a refractive index approximately equal to that of a cladding of the optical fiber is arranged around an uncovered portion 297a from which the covering 297 has been removed. Further, a light absorbing material 299 is provided on the circumferential surface of the refractive index matching member. In the same figure, reference numeral 283 denotes a light-permeable member, and reference numeral 13 denotes a bifurcated type light guide.

By adopting this construction, the cladding mode can be effectively removed. The cladding mode means the light transmitted through the cladding of the optical fiber, and the ratio thereof is great particularly in a multi-mode fiber.

In a case where a displacement or deviation occurs between the optical fiber and the light guide in the optical coupling of the optical fiber with the light guide in the optical transmit-receive module of this embodiment, part of light emitted from the optical fiber is reflected in Fresnel reflection manner by the light-permeable member and returns to the optical fiber. Most of the light returning to the optical fiber has a large numerical aperture (NA) and is originally not light that becomes the return light.

However, it is often the case where the fiber is covered with black polyethylene (refractive index n=1.54 and a transmittance of about 0%) or the like for reinforcement purpose, and then the light that has a large NA and would properly escape without such a covering is transmitted through the cladding due to this cover. The optical transmit-receive module of the nineteenth embodiment of the present invention is intended to remove the thus-caused cladding mode.

In order to obtain such an effect, as a material for the refractive index matching member 298, there are soft transparent gel materials such as a silicone-based gel material (for example, SE1740 of Toray Dow Corning Silicone Inc., having a refractive index n=1.405 or KE1031 of Shin-Etsu Chemical Co., Ltd., having a refractive index n=1.407).

As an example of a material for a light-absorbing member 299 provided around the refractive index matching member 298, there can be enumerated an appropriate amount of carbon dissolved in a painting use organic resin (for example, SH804 of Toray Dow Corning Silicone Inc.) exhibiting firm adhesion to the refractive index matching member 298, black resin (for example, the potting agent CY52-211 of Toray Dow Corning Silicone Inc.) exhibiting firm adhesion to the refractive index matching member 298, and the like, and the member is formed by the coating, potting or the like of either of these materials.

Table 2 numerically shows the effect of the optical transmit-receive module of the nineteenth embodiment of the present invention. When the length of the uncovered portion 297a, or the amount of removal of the covering was set to 1 cm, 3 cm and 5 cm, the ratio of the return light in the absence of the light-permeable member 283 was 2.12%, 1.71% and 1.16%, respectively, while the ratio of the return light in the presence of the light-permeable member 283 was 0.16%, 0.04% and 0.02%, respectively, exhibiting a remarkable improvement.

TABLE 2

| | Ratio of Return Light (%) | |
|---|---|---|
| Amount of Removal of Covering | Without light-permeable member | With light-permeable member |
| 1 cm | 2.12% | 0.16% |
| 3 cm | 1.71% | 0.04% |
| 5 cm | 1.16% | 0.02% |

Before forming the light-absorbing member 299 around the refractive index matching member 298, the surface of the refractive index matching member 298 may, preferably, be roughened by a physical method with a sandpaper or the like or an appropriate organic solvent treatment. Then, a superficial area increases, so that the cladding mode can be more effectively removed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. An optical transmit-receive coupler for optically connecting optical fibers to each other, each said optical fiber having approximately the same index of refraction and being supported by an associated fiber plug, comprising:
- a housing having a first open end and a second open end and being adapted to receive said optical fiber plugs in the first and second open ends, respectively;
- a support member mounted within said housing in a longitudinally central position of said housing; and
- a light-permeable member supported by said support member in a position aligned with said first and second open ends of said housing such that said optical fibers are connected with each other through said light-permeable member when said optical fiber plugs supporting the respective optical fibers are inserted into said housing through said first and second open ends, respectively, said light-permeable member having a refractive index approximately equal to said refractive indexes of each of said optical fibers.

2. The optical transmit-receive coupler according to claim 1, wherein said light-permeable member is made of a material which is deformable when in contact with said optical fiber plugs.

3. The optical transmit-receive coupler according to claim 2, wherein the light-permeable member is made of an elastic material.

4. The optical transmit-receive coupler according to claim 2, wherein the light-permeable member is made of a gel material.

5. An optical transmit-receive coupler system for optically connecting optical fibers to each other, comprising:
- two optical fiber plugs, each optical fiber plug supporting an associated optical fiber for optical transmission, each said optical fiber having approximately the same index of refraction;
- a housing having a first open end and a second open end, and being adapted to receive said optical fiber plugs in said first and second open ends, respectively;
- a support member mounted within said housing in a longitudinally central position of said housing; and
- a light-permeable member supported by said support member in a position aligned with said first and second open ends of said housing such that said optical fibers are connected with each other through said light-permeable member when said optical fiber plugs supporting the respective optical fibers are inserted into said housing through said first and second open ends, respectively, said light-permeable member having a refractive index approximately equal to said refractive indexes of each of said optical fibers.

\* \* \* \* \*